(12) United States Patent
Noda et al.

(10) Patent No.: US 10,954,340 B2
(45) Date of Patent: *Mar. 23, 2021

(54) POLYIMIDE PRECURSOR COMPOSITION

(71) Applicants: TOKYO OHKA KOGYO CO., LTD., Kawasaki (JP); ENEOS Corporation, Tokyo (JP)

(72) Inventors: Kunihiro Noda, Kawasaki (JP); Hiroki Chisaka, Kawasaki (JP); Dai Shiota, Kawasaki (JP); Shinichi Komatsu, Yokohama (JP)

(73) Assignees: Tokyo Ohka Kogyo Co., Ltd., Kawasaki (JP); ENEOS Corporation, Tokyo (JP)

( * ) Notice: Subject to any disclaimer, the term of this patent is extended or adjusted under 35 U.S.C. 154(b) by 168 days.

This patent is subject to a terminal disclaimer.

(21) Appl. No.: 15/749,921

(22) PCT Filed: Aug. 8, 2016

(86) PCT No.: PCT/JP2016/073305
§ 371 (c)(1),
(2) Date: Feb. 2, 2018

(87) PCT Pub. No.: WO2017/026448
PCT Pub. Date: Feb. 16, 2017

(65) Prior Publication Data
US 2018/0223045 A1 Aug. 9, 2018

(30) Foreign Application Priority Data

Aug. 7, 2015 (JP) .............................. JP2015-157775
Oct. 13, 2015 (JP) .............................. JP2015-202377

(51) Int. Cl.
C08G 73/12 (2006.01)
C08L 79/08 (2006.01)
C08G 73/10 (2006.01)
C08K 5/3445 (2006.01)

(52) U.S. Cl.
CPC ........... *C08G 73/126* (2013.01); *C08G 73/10* (2013.01); *C08G 73/1078* (2013.01); *C08G 73/1085* (2013.01); *C08K 5/3445* (2013.01); *C08L 79/08* (2013.01); *C08L 2203/16* (2013.01)

(58) Field of Classification Search
None
See application file for complete search history.

(56) References Cited

U.S. PATENT DOCUMENTS

| 9,410,055 | B2 | 8/2016 | Honda |
| 9,768,328 | B2 | 9/2017 | Komatsu et al. |
| 2013/0079490 | A1 | 3/2013 | Matsumoto et al. |
| 2013/0324662 | A1 | 12/2013 | Honda |
| 2014/0224318 | A1 | 8/2014 | Matsumoto et al. |
| 2014/0234784 | A1 | 8/2014 | Chisaka et al. |
| 2015/0086753 | A1 | 3/2015 | Matsumoto et al. |
| 2017/0313821 | A1 | 11/2017 | Oka et al. |
| 2017/0342215 | A1 | 11/2017 | Oka et al. |
| 2018/0194930 | A1 | 7/2018 | Noda et al. |
| 2018/0223045 | A1 | 8/2018 | Noda et al. |
| 2019/0062503 | A1 | 2/2019 | Komatsu et al. |

FOREIGN PATENT DOCUMENTS

| EP | 3228641 A1 | 10/2017 |
| JP | S59-223725 A | 12/1984 |
| JP | S61-267030 A | 11/1986 |
| JP | H04-085363 A | 3/1992 |
| JP | H06-234668 A | 8/1994 |
| JP | H10-330615 A | 12/1998 |
| JP | 2006-189591 A | 7/2006 |
| JP | 2008-216988 A | 9/2008 |
| JP | 2009-019113 A | 1/2009 |
| JP | 2014-157297 A | 8/2014 |
| JP | 2014-157310 A | 8/2014 |
| JP | 2015-227990 A | 12/2015 |
| JP | 2016-102147 A | 6/2016 |
| JP | 2017-005026 A | 1/2017 |
| WO | WO 2011/010619 A1 | 1/2011 |
| WO | WO 2011/099518 A1 | 8/2011 |

(Continued)

OTHER PUBLICATIONS

Engineering plastic, Kyoritsu Shuppan, 1987, p. 88.
Macromolecules, vol. 27, 1994, p. 1117.
Supplementary European search report issued in European Patent Application No. 16835145.0, dated Sep. 18, 2018.
Office Action issued in U.S. Appl. No. 15/558,434, dated Oct. 10, 2019.
Wong et al (New Investigation of 1-Substituted Imidazole Derivatives as Thermal Latent Catalysts for Epoxy-Phenolic Resins, Journal of Applied Polymer Science, vol. 104, 3292-3300 (2007).
Office Action in Japanese Patent Application No. 2017-509870 dated Aug. 7, 2018.

(Continued)

*Primary Examiner* — Rachel Kahn
(74) *Attorney, Agent, or Firm* — Knobbe Martens Olson & Bear LLP

(57) ABSTRACT

A polyimide precursor composition that exhibits excellent tensile strength and breaking elongation, and that provides a film containing an alicyclic polyimide resin; a method for producing a polyimide film using the polyimide precursor composition; and a permanent film that contains an alicyclic polyimide resin and that exhibits excellent tensile strength and breaking elongation. The polyimide precursor composition is a mixture of a resin precursor component which is a polyamic acid including an alicyclic backbone having a predetermined structure, a monomer component that includes an aromatic diamine compound having a predetermined structure or an alicyclic tetracarboxylic acid dianhydride having a predetermined structure; an imidazole compound having a predetermined structure; and a solvent.

4 Claims, No Drawings

(56) References Cited

FOREIGN PATENT DOCUMENTS

| WO | WO 2012/137840 A1 | 10/2012 | | |
|---|---|---|---|---|
| WO | WO 2013/021942 A1 | 2/2013 | | |
| WO | WO-2013168691 A1 * | 11/2013 | ........... | C07D 231/12 |
| WO | WO 2015/080158 A1 | 6/2015 | | |
| WO | WO 2016/063988 A1 | 4/2016 | | |
| WO | WO 2016/063993 A1 | 4/2016 | | |
| WO | WO 2016/093254 A1 | 6/2016 | | |

OTHER PUBLICATIONS

Office Action in Korean Patent Application No. 10-2017-7026488 dated Mar. 1, 2019.
"Sun Guishu Guide to High School Chemistry. Revised Edition", Educational Sciences Press, pp. 320, published date: Jun. 30, 1995.
"Basic Chemistry", Choi Kin-wah, Guangxi People Publishing House, pp. 120-123, published date: Aug. 31, 2014.
Office Action issued in Chinese Patent Application No. 201680046226.2, dated Feb. 3, 2020.

* cited by examiner

POLYIMIDE PRECURSOR COMPOSITION

This application is the U.S. National Phase under 35 U.S.C. § 371 of International Application PCT/JP2016/073305, filed Aug. 8, 2016, designating the U.S., and published in Japanese as WO 2017/026448 on Feb. 6, 2017 which claims priority to Japanese Patent Application No. 2015-157775, filed Aug. 7, 2015, and Japanese Patent Application No. 2015-202377, filed Oct. 13, 2015, the entire contents of which are incorporated herein by reference.

PARTIES TO JOINT RESEARCH AGREEMENT

The present invention was made pursuant to a joint research agreement between Tokyo Ohka Kogyo Co., Ltd. and JXTG Nippon Oil & Energy Corporation.

TECHNICAL FIELD

The present invention relates to a polyimide precursor composition containing a precursor component of a polyimide resin, a method for producing a polyimide film using the polyimide precursor composition, and a permanent film.

BACKGROUND ART

Polyimide resins have properties such as excellent heat resistance, mechanical strength, insulation properties, and low dielectric constant. Therefore, polyimide resins have widely been used as insulating materials and protective materials in electric/electronic components, for example, various elements and electronic boards such as multilayer wiring boards.

Because of having excellent mechanical properties and heat resistance, a wholly aromatic polyimide (e.g., trade name "Kapton") has conventionally been used in high-tech industry such as aerospace applications. Such wholly aromatic polyimide is synthesized by a reaction of an aromatic tetracarboxylic dianhydride with an aromatic diamine. For example, there has been known that the above-mentioned Kapton has heat resistance (glass transition temperature (Tg): 410° C.) of the highest level among heat-resistant polymers (see Non-Patent Document 1).

However, such wholly aromatic polyimide exhibits a brown color due to charge transfer (CT) between a tetracarboxylic dianhydride unit of an aromatic ring system and a diamine unit of an aromatic ring system. Therefore, it was difficult to apply the wholly aromatic polyimide to optical applications that require transparency.

Therefore, to produce polyimides usable in optical applications, a study on an alicyclic polyimide having high light transmittance free from CT has proceeded. Examples of such alicyclic polyimide include three types of resins, such as a resin obtained by a reaction of an alicyclic tetracarboxylic dianhydride with an alicyclic diamine, a resin obtained by a reaction of an alicyclic tetracarboxylic dianhydride with an aromatic diamine, and a resin obtained by a reaction of an aromatic tetracarboxylic dianhydride with an alicyclic diamine.

However, it was difficult for a polyimide obtained by using an alicyclic diamine among these alicyclic polyimides to perform increasing the molecular weight. The alicyclic diamine has basicity which is at least 100 times higher than that of an aromatic diamine. Therefore, the polymerization behavior of the alicyclic diamine is completely different from that of the aromatic diamine. As a result, when using the aliphatic diamine, a salt is precipitated during the polymerization, so that increasing the molecular weight does not easily proceed.

Meanwhile, the alicyclic polyimide obtained by using an alicyclic tetracarboxylic dianhydride in combination with an aromatic diamine can be produced with direct application of usual synthetic procedures for the wholly aromatic polyimide, so that it is easy to perform increasing the molecular weight. Among the alicyclic polyimides, the alicyclic polyimide obtained by using an alicyclic tetracarboxylic dianhydride in combination with an aromatic diamine have attracted attention in recent years. A study has been made on the alicyclic polyimide using a monocyclic, bicyclo cyclic, tricyclo cyclic, tetracyclo cyclic, or spirocyclic alicyclic tetracarboxylic dianhydride.

Non-Patent Document 1: Engineering Plastic, published in 1987 by Kyoritu Shuppan Co., Ltd., p 88

Non-Patent Document 2: Macromolecules, Vol. 27, published in 1994, p 1117

DISCLOSURE OF THE INVENTION

Problems to be Solved by the Invention

When a film of an alicyclic polyimide is formed, a film having excellent appearance such as transparency, yellowness index, and Haze is obtained. However, there was a problem that it is difficult to obtain a film having satisfactory tensile strength and elongation at break. The tensile strength and the elongation at break are important mechanical properties in the film. Therefore, there has been required a polyimide precursor composition containing an alicyclic polyimide resin, which gives a film exhibiting satisfactory tensile strength and elongation at break.

In light of the above problems, the present invention has been made and an object thereof is to provide a polyimide precursor composition which exhibits satisfactory tensile strength and elongation at break, and contains an alicyclic polyimide resin; a method for producing a polyimide film using the polyimide precursor composition; and a permanent film which exhibits satisfactory tensile strength and elongation at break, and contains an alicyclic polyimide resin.

Means for Solving the Problems

The present inventors have found that the above problems can be solved by using a polyimide precursor composition obtained by mixing a resin precursor component (B) selected from a monomer component containing an aromatic diamine compound having a predetermined structure and an alicyclic tetracarboxylic dianhydride having a predetermined structure, and a polyamic acid including an alicyclic skeleton having a predetermined structure, an imidazole compound (A) having a predetermined structure, and a solvent (S). Thus, the present invention has been completed. Specifically, the present invention provides the following.

A first aspect of the present invention is directed to a polyimide precursor composition including an imidazole compound (A), a resin precursor component (B), and a solvent (S), wherein the imidazole compound (A) is a compound represented by the following formula (1):

[Chem. 1]

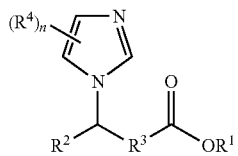

(1)

wherein, in the formula (1), $R^1$ is a hydrogen atom or an alkyl group, $R^2$ is an optionally substituted aromatic group, $R^3$ is an optionally substituted alkylene group, $R^4$ each independently represent a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group, n is an integer of 0 to 3; and the resin precursor component (B) is at least one selected from the group consisting of a monomer component containing a diamine compound represented by the following formula (2):

(2)

wherein, in the formula (2), $R^{b10}$ is an aryl group having 6 to 40 carbon atoms, and norbornane-2-spiro-α-cycloalkanone-α'-spiro-2''-norbornane-5,5'',6,6''-tetracarboxylic dianhydrides represented by the following formula (b1):

[Chem. 2]

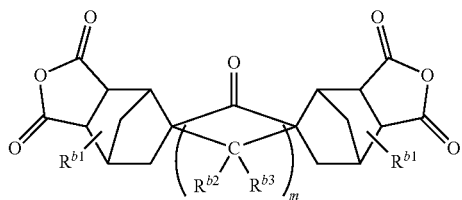

(b1)

wherein, in the formula (b1), $R^{b1}$, $R^{b2}$, and $R^{b3}$ each independently represent one selected from the group consisting of a hydrogen atom, an alkyl group having 1 to 10 carbon atoms, and a fluorine atom, and m represents an integer of 0 to 12, and a polyamic acid including a repeating unit represented by the following formula (b2):

[Chem. 3]

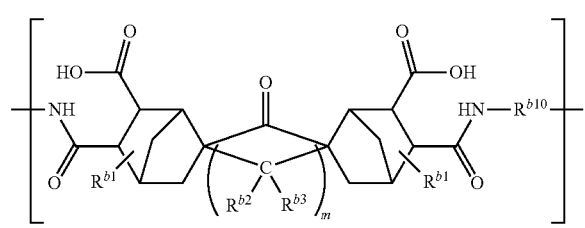

(b2)

wherein, in the formula (b2), $R^{b1}$, $R^{b2}$, and $R^{b3}$ each independently represent one selected from the group consisting of a hydrogen atom, an alkyl group having 1 to 10 carbon atoms, and a fluorine atom, $R^{b10}$ represents an aryl group having 6 to 40 carbon atoms, and m represents an integer of 0 to 12.

A second aspect of the present invention is directed to a method for producing a polyimide film, which includes a formation step of forming a coating film of the polyimide precursor composition according the first aspect; and a ring-closing step of heating the coating film to ring-close a polyamic acid derived from a resin precursor component (B) in the coating film.

A third aspect of the present invention is directed to a permanent film including an imidazole compound (A) and a polyimide resin, wherein
the imidazole compound (A) is a compound represented by the following formula (1):

[Chem. 4]

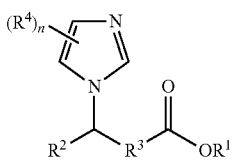

(1)

wherein, in the formula (1), $R^1$ is a hydrogen atom or an alkyl group, $R^2$ is an optionally substituted aromatic group, $R^3$ is an optionally substituted alkylene group, $R^4$ each independently represent a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group, and n is an integer of 0 to 3; and
the polyimide resin is a resin in which a polyamic acid including a repeating unit as a main component represented by the following formula (b2):

[Chem. 5]

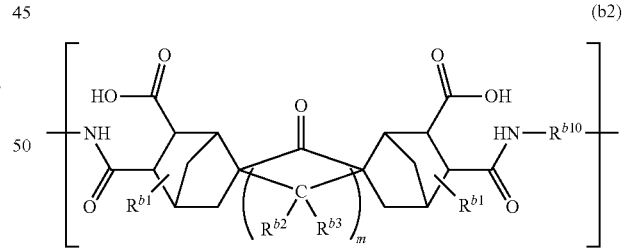

(b2)

wherein, in the formula (b2), $R^{b1}$, $R^{b2}$, and $R^{b3}$ each independently represent one selected from the group consisting of a hydrogen atom, an alkyl group having 1 to 10 carbon atoms, and a fluorine atom, $R^{b10}$ represents an aryl group having 6 to 40 carbon atoms, and m represents an integer of 0 to 12 is ring-closed.

A fourth aspect of the present invention is directed to a polyimide film obtained by using the polyimide precursor composition according to the first aspect.

A fifth aspect of the present invention is directed to a polyimide film including an imidazole compound (A) and a polyimide resin, wherein the imidazole compound (A) is a compound represented by the following formula (1):

[Chem. 6]

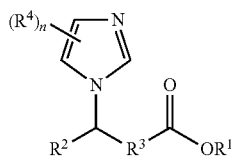

(1)

wherein, in the formula (1), $R^1$ is a hydrogen atom or an alkyl group, $R^2$ is an optionally substituted aromatic group, $R^3$ is an optionally substituted alkylene group, $R^4$ each independently represent a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group, and n is an integer of 0 to 3;
and
the polyimide resin is a resin in which polyamic acid composed of a repeating unit represented by the following formula (b2):

[Chem. 7]

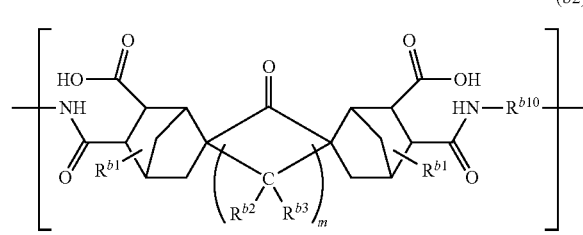

(b2)

wherein, in the formula (b2), $R^{b1}$, $R^{b2}$, and $R^{b3}$ each independently represent one selected from the group consisting of a hydrogen atom, an alkyl group having 1 to 10 carbon atoms, and a fluorine atom, $R^{b10}$ represents an aryl group having 6 to 40 carbon atoms, and m represents an integer of 0 to 12 is ring-closed.

Effects of the Invention

According to the present invention, it is possible to provide a polyimide precursor composition giving a film which exhibits satisfactory tensile strength and elongation at break and contains an alicyclic polyimide resin; a method for producing a polyimide film using the polyimide precursor composition; and a permanent film which exhibits satisfactory tensile strength and elongation at break, and contains an alicyclic polyimide resin.

PREFERRED MODE FOR CARRYING OUT THE INVENTION

≤Polyimide Precursor Composition≥
The polyimide precursor composition according to the first aspect of the present invention includes an imidazole compound (A), a resin precursor component (B), and a solvent (S). Essential or optional components included in the polyimide precursor composition will be described in order below.

<Imidazole Compound (A)>
The imidazole compound (A) is represented by the following formula (1). Inclusion of the imidazole compound (A) in the polyimide precursor composition enables formation of a polyimide film having excellent tensile elongation using the polyimide precursor composition.

[Chem. 8]

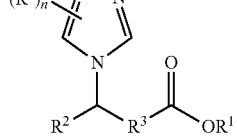

(1)

In the formula (1), $R^1$ is a hydrogen atom or an alkyl group, $R^2$ is an optionally substituted aromatic group, $R^3$ is an optionally substituted alkylene group, $R^4$ is a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group, and n is an integer of 0 to 3.

In the formula (1), $R^1$ is a hydrogen atom or an alkyl group. When $R^1$ is an alkyl group, the alkyl group may be either a linear alkyl group or a branched alkyl group. The number of carbon atoms of the alkyl group is not particularly limited, but is preferably 1 to 20, more preferably 1 to 10, and still more preferably 1 to 5.

Specific examples of the alkyl group suitable as $R^1$ include a methyl group, an ethyl group, an n-propyl group, an isopropyl group, an n-butyl group, an isobutyl group, an sec-butyl group, a tert-butyl group, an n-pentyl group, an isopentyl group, a tert-pentyl group, an n-hexyl group, an n-heptyl group, an n-octyl group, a 2-ethyl-n-hexyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group.

In the formula (1), $R^2$ is an optionally substituted aromatic group. The optionally substituted aromatic group may be either an optionally substituted aromatic hydrocarbon group, or an optionally substituted aromatic heterocyclic group.

The type of the aromatic hydrocarbon group is not particularly limited as long as it does not interfere with the object of the present invention. The aromatic hydrocarbon group may be a monocyclic aromatic group, may be a group formed by condensation of two or more aromatic hydrocarbon groups, or may be a group formed by bonding two or more aromatic hydrocarbon groups through a single bond. The aromatic hydrocarbon group is preferably a phenyl group, a naphthyl group, a biphenylyl group, an anthryl group, or a phenanthrenyl group.

The type of the aromatic heterocyclic group is not particularly limited as long as it does not interfere with the object of the present invention. The aromatic heterocyclic group may be either a monocyclic group or a polycyclic group. The aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, and a benzoimidazolyl group.

Examples of the substituent, which may be possessed by a phenyl group, a polycyclic aromatic hydrocarbon group, or an aromatic heterocyclic group, include a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, and an organic group. When the phenyl group, the polycyclic aromatic hydrocarbon group, or the aromatic heterocyclic group have plural substituents, the plural substituents may be the same or different.

When the substituent, which is possessed by the aromatic group, is an organic group, examples of the organic group include an alkyl group, an alkenyl group, a cycloalkyl group, a cycloalkenyl group, an aryl group, and an aralkyl group. This organic group may have a bond or a substituent, other than a hydrocarbon group such as a heteroatom, in the organic group. This organic group may be either linear, branched, or cyclic. This organic group is usually monovalent, but can be a divalent or higher polyvalent organic group when forming a cyclic structure.

When the aromatic group has a substituent on neighboring carbon atoms, two substituents bonded on neighboring carbon atoms may be bonded to form a cyclic structure. Examples of the cyclic structure include an aliphatic hydrocarbon ring, and an aliphatic ring having a heteroatom.

When the substituent, which is possessed by the aromatic group, is an organic group, the bond included in the organic group is not particularly limited as long as the effect of the present invention is not impaired. The organic group may include a bond having a heteroatom such as an oxygen atom, a nitrogen atom, or a silicon atom. Specific examples of the bond containing a heteroatom include, an ether bond, a thioether bond, a carbonyl bond, a thiocarbonyl bond, an ester bond, an amide bond, a urethane bond, an imino bond (—N═C(—R)—, —C(═NR)—: R represents a hydrogen atom or a monovalent organic group), a carbonate bond, a sulfonyl bond, a sulfinyl bond, an azo bond, and the like.

From the viewpoint of heat resistance of the imidazole compound represented by the formula (1), the bond containing a heteroatom, which may be possessed by an organic group, is preferably an ether bond, a thioether bond, a carbonyl bond, a thiocarbonyl bond, an ester bond, an amide bond, an amino bond (—NR—: R represents a hydrogen atom or a monovalent organic group), an urethane bond, an imino bond (—N═C(—R)—, —C(═NR)—: R represents a hydrogen atom or a monovalent organic group), a carbonate bond, a sulfonyl bond, or a sulfinyl bond.

When the organic group is a substituent other than the hydrocarbon group, the type of the substituent other than the hydrocarbon group is not particularly limited as long as it does not interfere with the object of the present invention. Specific examples of the substituent other than the hydrocarbon group include a halogen atom, a hydroxy group, a mercapto group, a sulfide group, a cyano group, an isocyano group, a cyanato group, an isocyanato group, a thiocyanato group, an isothiocyanato group, a silyl group, an silanol group, an alkoxy group, an alkoxycarbonyl group, an amino group, a monoalkylamino group, a dialkylamino group, a monoarylamino group, a diarylamino group, a carbamoyl group, a thiocarbamoyl group, a nitro group, a nitroso group, a carboxylate group, an acyl group, an acyloxy group, a sulfino group, a sulfonato group, a phosphino group, a phosphinyl group, a phosphonato group, an alkyl ether group, an alkenyl ether group, an alkyl thioether group, an alkenyl thioether group, an aryl ether group, an aryl thioether group, and the like. The hydrogen atom included in the substituent mentioned above may be substituted with a hydrocarbon group. The hydrocarbon group included in the substituent mentioned above may be either linear, branched, or cyclic.

The substituent, which is possessed by a phenyl group, a polycyclic aromatic hydrocarbon group, or an aromatic heterocyclic group, is preferably an alkyl group having 1 to 12 carbon atoms, an aryl group having 1 to 12 carbon atoms, an alkoxy group having 1 to 12 carbon atoms, an aryloxy group having 1 to 12 carbon atoms, an arylamino group having 1 to 12 carbon atoms, and a halogen atom.

$R^2$ is preferably an optionally substituted phenyl group, an optionally substituted furyl group, or an optionally substituted thienyl group, since an imidazole compound represented by the formula (1) can be synthesized inexpensively and easily, and the imidazole compound has satisfactory solubility in water or an organic solvent.

In the formula (1), $R^3$ is an optionally substituted alkylene group. The substituent, which may be possessed by an alkylene group, is not particularly limited as long as it does not interfere with the object of the present invention. Specific examples of the substituent, which may be possessed by an alkylene group, include a hydroxy group, an alkoxy group, an amino group, a cyano group, a halogen atom, and the like. The alkylene group may be either a linear alkylene group or a branched alkylene group, and is preferably a linear alkylene group. The number of carbon atoms of the alkylene group is not particularly limited, but is preferably 1 to 20, more preferably 1 to 10, and still more preferably 1 to 5. Note that the number of carbon atoms of the alkylene group does not include the number of carbon atoms of the substituent bonded to an alkylene group.

The alkoxy group as the substituent bonded to the alkylene group may be either a linear alkoxy group or a branched alkoxy group. The number of carbon atoms of the alkoxy group as the substituent is not particularly limited, but is preferably 1 to 10, more preferably 1 to 6, and particularly preferably 1 to 3.

The amino group as the substituent bonded to the alkylene group may be a monoalkylamino group or a dialkylamino group. The alkyl group included in the monoalkylamino group or dialkylamino group may be either a linear alkyl group or a branched alkyl group. The number of carbon atoms of the alkyl group included in the monoalkylamino group or dialkylamino group is not particularly limited, but is preferably 1 to 10, more preferably 1 to 6, and particularly preferably 1 to 3.

Specific examples of the alkylene group suitable as $R^3$ include a methylene group, an ethane-1,2-diyl group, an n-propane-1,3-diyl group, an n-propane-2,2-diyl group, an n-butane-1,4-diyl group, an n-pentane-1,5-diyl group, an n-hexane-1,6-diyl group, an n-heptane-1,7-diyl group, an n-octane-1,8-diyl group, an n-nonane-1,9-diyl group, an n-decane-1,10-diyl group, an n-undecane-1,11-diyl group, an n-dodecane-1,12-diyl group, an n-tridecane-1,13-diyl group, an n-tetradecane-1,14-diyl group, an n-pentadecane-1,15-diyl group, an n-hexadecane-1,16-diyl group, an n-heptadecane-1,17-diyl group, an n-octadecane-1,18-diyl group, an n-nonadecane-1,19-diyl group, and an n-icosane-1,20-diyl group.

$R^4$ is a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group, and n is an integer of 0 to 3. When n is an integer of 2 to 3, plural $R^4$(s) may be the same or different.

When R$^4$ is an organic group, the organic group is the same as an organic group, which may be possessed by an aromatic group as a substituent, as for R$^2$.

When R$^4$ is an organic group, the organic group is preferably an alkyl group, an aromatic hydrocarbon group, and an aromatic heterocyclic group. The alkyl group is preferably a linear or branched alkyl group having 1 to 8 carbon atoms, and more preferably a methyl group, an ethyl group, an n-propyl group, and an isopropyl group. The aromatic hydrocarbon group is preferably a phenyl group, a naphthyl group, a biphenylyl group, an anthryl group, and a phenanthrenyl group, more preferably a phenyl group and a naphthyl group, and particularly preferably a phenyl group. The aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, and a benzoimidazolyl group, and more preferably a furyl group and a thienyl group.

When R$^4$ is an alkyl group, the position of the alkyl group bonding on an imidazole ring is preferably any one of 2-, 4-, and 5-positions, and more preferably 2-position. When R$^4$ is an aromatic hydrocarbon group and an aromatic heterocyclic group, the position of these groups bonding on imidazole is preferably 2-position.

Among the above-mentioned imidazole compounds represented by the formula (1), a compound represented by the following formula (1-1) is preferable since it can be synthesized inexpensively and easily, and a compound represented by the formula (1-1) in which R$^3$ is a methylene group is more preferable.

[Chem. 9]

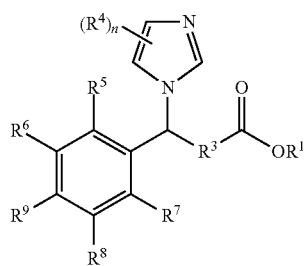

(1-1)

In the formula (1-1), R$^1$, R$^3$, R$^4$, and n are the same as those defined in the formula (1); and R$^5$, R$^6$, R$^9$, R$^8$, and R$^9$ are each independently a hydrogen atom, a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group, provided that at least one of R$^5$, R$^6$, R$^9$, R$^8$, and R$^9$ is a group other than a hydrogen atom.

When R$^5$, R$^6$, R$^7$, R$^8$, and R$^9$ are organic groups, the organic group is the same as an organic group which is possessed by R$^2$ in the formula (1) as a substituent. R$^5$, R$^6$, R$^7$, and R$^8$ are preferably hydrogen atoms in view of the solubility of an imidazole compound in a solvent (S).

Among these, at least one of R$^5$, R$^6$, R$^7$, R$^8$, and R$^9$ is preferably the following substituent; and R$^9$ is particularly preferably the following substituent. When R$^9$ is the following substituent, R$^5$, R$^6$, R$^7$, and R$^8$ are preferably hydrogen atoms.

—O—R$^{10}$ (R$^{10}$ is a hydrogen atom or an organic group.)

When R$^{10}$ is an organic group, the organic group is the same as an organic group which is possessed by R$^2$ in the formula (1) as a substituent. R$^{10}$ is preferably an alkyl group, more preferably, an alkyl group having 1 to 8 carbon atoms, particularly preferably an alkyl group having 1 to 3 carbon atoms, and most preferably a methyl group.

Among the compounds represented by the above-mentioned formula (1-1), a compound represented by the following formula (1-1-1) is preferable.

[Chem. 10]

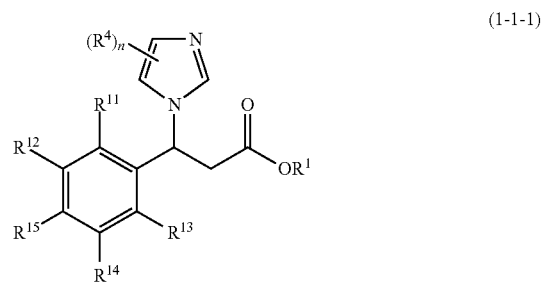

(1-1-1)

In the formula (1-1-1), R$^1$, R$^4$, and n are the same as those defined in the formula (1); and R$^{11}$, R$^{12}$, R$^{13}$, R$^{14}$, and R$^{15}$ are each independently a hydrogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group, provided that at least one of R$^{11}$, R$^{12}$, R$^{13}$, R$^{14}$, and R$^{15}$ is a group other than a hydrogen atom.

Among the compounds represented by the formula (1-1-1), at least one of R$^{11}$, R$^{12}$, R$^{13}$, R$^{14}$, and R$^{15}$ is preferably represented by the above-mentioned —O—R$^{10}$; and R$^{15}$ is particularly preferably a group represented by —O—R$^{10}$. When R$^{15}$ is a group represented by —O—R$^{10}$, R$^{11}$, R$^{12}$, R$^{13}$, and R$^{14}$ are preferably hydrogen atoms.

The method for synthesizing an imidazole compound represented by the above-mentioned formula (1) is not particularly limited. For example, imidazolylation is performed by reacting a halogen-containing carboxylic acid derivative represented by the following formula (I) with an imidazole compound represented by the following formula (II) in accordance with a conventional method, thereby making it possible to synthesize an imidazole compound represented by the above-mentioned formula (1).

[Chem. 11]

(I)

(II)

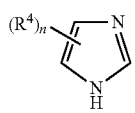

In the formulas (I) and (II), R', $R^2$, $R^3$, $R^4$, and n are the same as those defined in the formula (1). In the formula (I), Hal is a halogen atom.

When the imidazole compound is a compound represented by the formula (1) in which $R^3$ is a methylene group, that is, the imidazole compound is a compound represented by the following formula (1-2), it is also possible to synthesize the imidazole compound by the Michael addition reaction which will be described below.

[Chem. 12]

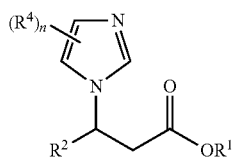

(1-2)

In the formula (1-2), R', $R^2$, $R^4$, and n are the same as those defined in the formula (1).

Specifically, for example, a 3-substituted acrylic acid derivative represented by the following formula (III) is mixed with an imidazole compound represented by the above-mentioned formula (II) in a solvent to cause a Michael addition reaction, thereby obtaining an imidazole compound represented by the above-mentioned formula (1-2).

[Chem. 13]

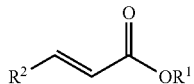

(III)

In the formula (III), $R^1$ and $R^2$ are the same as those defined in the formula (1).

A 3-substituted acrylic acid derivative having an imidazolyl group represented by the following formula (IV) is added in a solvent containing water, thereby obtaining an imidazole compound represented by the following formula (1-3).

[Chem. 14]

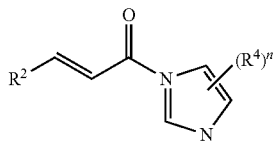

(IV)

(1-3)

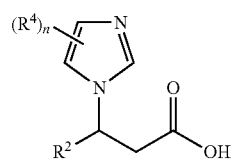

In the formulas (IV) and (1-3), $R^2$, $R^4$, and n are the same as those defined in the formula (1).

In this case, hydrolysis of a 3-substituted acrylic acid derivative represented by the above-mentioned formula (IV) leads to production of an imidazole compound represented by the above-mentioned formula (II) and a 3-substituted acrylic acid represented by the following formula (V). Then, the Michael addition reaction occurs between the 3-substituted acrylic acid represented by the following formula (V) and an imidazole compound represented by the above-mentioned formula (II) to produce an imidazole compound represented by the above-mentioned formula (1-3).

[Chem. 15]

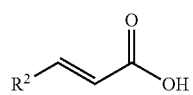

(V)

In the formula (V), $R^2$ is the same as those defined in the formula (1).

Suitable specific examples of the imidazole compound represented by the formula (1) include the following compounds.

[Chem. 16]

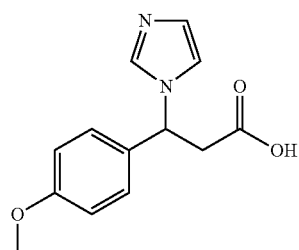

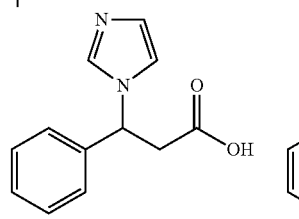 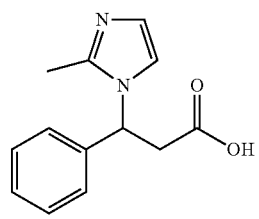

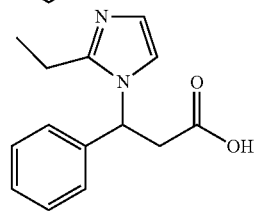

-continued

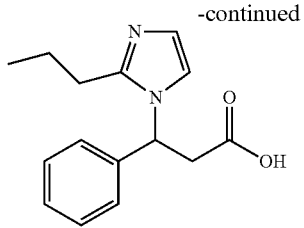

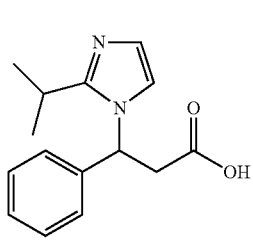
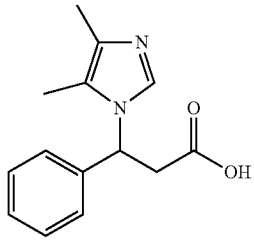

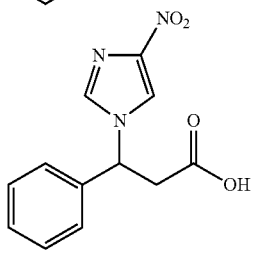

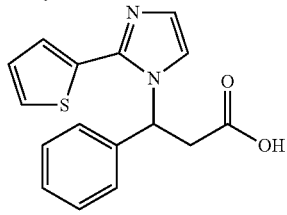

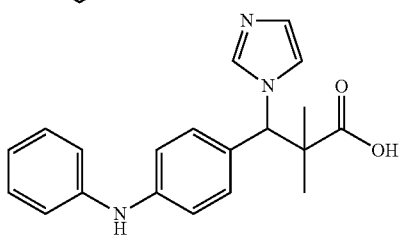

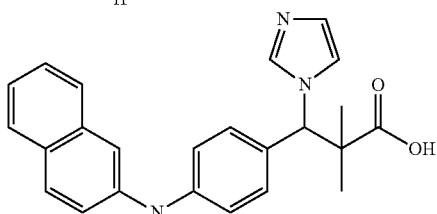

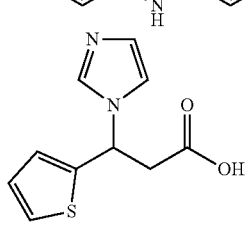

The content of the imidazole compound (A) in the polyimide precursor composition is not particularly limited as long as it does not interfere with the object of the present invention. The content of the imidazole compound (A) is, for example, 1 part by mass or more based on 100 parts by mass of the below-mentioned resin precursor component (B). The upper limit is not particularly limited and is, for example, 60 parts by mass or less. The content of the imidazole compound (A) is more preferably 5 to 50 parts by mass, and particularly preferably 10 to 40 parts by mass, based on 100 parts by mass of the resin precursor component (B). By using the imidazole compound (A) in the amount within the above range, it is easy to form a polyimide film which is excellent in tensile strength and elongation at break, and is excellent in heat resistance.

<Resin Precursor Component (B)>

The resin precursor component (B) is at least one selected from the group consisting of a monomer component containing a predetermined diamine compound and norbornane-2-spiro-α-cycloalkanone-α'-spiro-2"-norbornane-5,5",6,6"-tetracarboxylic dianhydrides represented by the following formula (b1), and a polyamic acid including a repeating unit represented by the following formula (b2):

[Chem. 17]

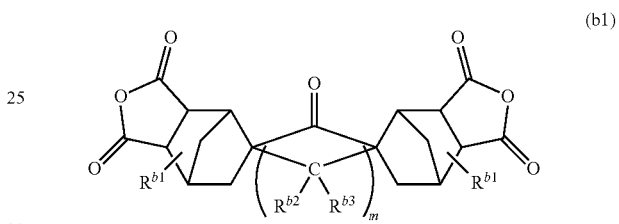

(b1)

wherein, in the formula (b1), $R^{b1}$, $R^{b2}$, and $R^{b3}$ each independently represent one selected from the group consisting of a hydrogen atom, an alkyl group having 1 to 10 carbon atoms, and a fluorine atom, and m represents an integer of 0 to 12:

[Chem. 18]

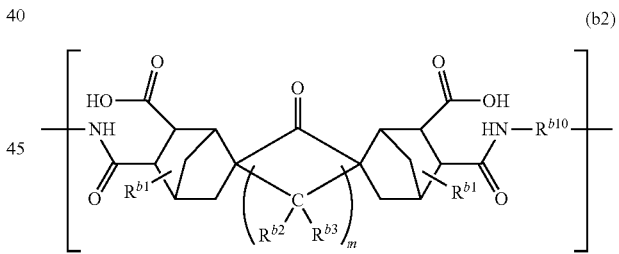

(b2)

wherein, in the formula (b2), $R^{b1}$, $R^{b2}$, and $R^{b3}$ each independently represent one selected from the group consisting of a hydrogen atom, an alkyl group having 1 to 10 carbon atoms, and a fluorine atom, $R^{b10}$ represents an aryl group having 6 to 40 carbon atoms, and m represents an integer of 0 to 12.

The monomer component and the polyamic acid will be described below.

[Monomer Component]

When the resin precursor component (B) includes a monomer component, the monomer component contains a diamine compound, and norbornane-2-spiro-α-cycloalkanone-α'-spiro-2"-norbornane-5,5",6,6"-tetracarboxylic dianhydrides (hereinafter also referred to as "tetracarboxylic dianhydride (B1)"). Essential or optional components, which may be included in the monomer component, will be described below.

(Diamine Compound)

The diamine compound is represented by the following formula (2). These diamine compounds can be used alone, or two or more diamine compounds can be used in combination.

In the formula, $R^{b10}$ is an aryl group having 6 to 40 carbon atoms.

The aryl group selectable as $R^{b10}$ in the formula (2) has 6 to 40 carbon atoms, preferably 6 to 30 carbon atoms, and more preferably 12 to 20 carbon atoms. When the aryl group has more than 40 carbon atoms, the heat resistance of the thus obtained polyimide resin may deteriorate. When the aryl group has less than 6 carbon atoms, the solubility in a solvent of the thus obtained polyimide resin may deteriorate.

$R^{b10}$ in the formula (2) is preferably at least one of the groups represented by the following formulas (3) to (6) from the viewpoint of the balance between the heat resistance and the solubility in a solvent of the thus obtained polyimide resin.

[Chem. 19]

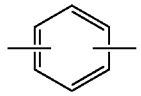 (3)

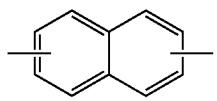 (4)

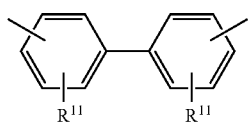 (5)

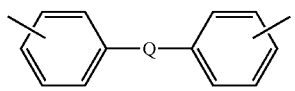 (6)

In the formula (5), $R^{11}$ represents one selected from the group consisting of a hydrogen atom, a fluorine atom, a methyl group, an ethyl group, and a trifluoromethyl group. In the formula (6), Q represents a 9,9'-fluorenylidene group, or one selected from the group consisting of groups represented by the formulas: —$C_6H_4$—, —CONH—$C_6H_4$—NHCO—, —NHCO—$C_6H_4$—CONH—, —O—$C_6H_4$—CO—$C_6H_4$—O—, —OCO—$C_6H_4$—COO—, —OCO—$C_6H_4$—$C_6H_4$—COO—, —OCO—, —O—, —S—, —CO—, —CONH—, —$SO_2$—, —C(CF$_3$)$_2$—, —C(CH$_3$)$_2$—, —CH$_2$—, —O—$C_6H_4$—C(CH$_3$)$_2$—$C_6H_4$—O—, —O—$C_6H_4$—C(CF$_3$)$_2$—$C_6H_4$—O—, —O—$C_6H_4SO_2$—$C_6H_4$—O—, —C(CH$_3$)$_2$—$C_6H_4$—C(CH$_3$)$_2$—, —O—$C_6H_4$—$C_6H_4$—O—, and —O—$C_6H_4$—O—.

$R^{11}$ in the formula (5) is more preferably a hydrogen atom, a fluorine atom, a methyl group, or an ethyl group, and particularly preferably a hydrogen atom, from the viewpoint of the heat resistance of the thus obtained polyimide resin.

Q in the formula (6) is preferably a 9,9'-fluorenylidene group, —O—$C_6H_4$—O—, —O—, —C(CH$_3$)$_2$—, —CH$_2$—, or —O—$C_6H_4$—C(CH$_3$)$_2$—$C_6H_4$—O—, or —CONH—, and particularly preferably —O—$C_6H_4$—O— or —O—, from the viewpoint of the balance between the heat resistance of the thus obtained polyimide resin and the solubility in an organic solvent.

Among the groups represented by the formulas (3) to (6), a group represented by the formula (5) or the formula (6) is more preferable, and a group represented by the formula (6) is particularly preferable, since it becomes easier to obtain a polyimide resin having more excellent heat resistance.

Suitable specific examples of the aromatic diamine represented by the formula (2) include 4,4'-diaminodiphenylmethane, 3,3'-diaminodiphenylmethane, 4,4'-diaminodiphenylethane, 3,3'-diaminodiphenylethane, 4,4'-diaminobiphenyl, 3,3'-diaminobiphenyl, 4,4'-diaminodiphenyl ether, 3,3'-diaminodiphenyl ether, 2,2-bis(4-aminophenoxyphenyl)propane, 1,3-bis(4-aminophenoxy)benzene, 1,3-bis(3-aminophenoxy)benzene, bis[4-(4-aminophenoxy)phenyl]sulfone, bis[4-(3-aminophenoxy)phenyl]sulfone, 2,2'-bis(trifluoromethyl)-4,4'-diaminobiphenyl, 3,4'-diaminodiphenyl ether, 4,4'-diaminobenzophenone, 3,3'-diaminobenzophenone, 9,9-bis(4-aminophenyl)fluorene, p-diaminobenzene, m-diaminobenzene, o-diaminobenzene, 4,4'-diaminobiphenyl, 3,3'-diaminobiphenyl, 2,2'-diaminobiphenyl, 3,4'-diaminobiphenyl, 2,6-diaminonaphthalene, 1,4-diaminonaphthalene, 1,5-diaminonaphthalene, 4,4'-[1,3-phenylenebis(1-methyl-ethylidene)]bisaniline, 4,4'-[1,4-phenylenebis(1-methyl-ethylidene)]bisaniline, 2,2'-dimethyl-4,4'-diaminobiphenyl, 3,3'-dimethyl-4,4'-diaminobiphenyl, 3,3'-diaminodiphenyl sulfone, 4,4'-diaminodiphenyl sulfone, 4,4'-diaminodiphenyl sulfide, 1,4-bis(4-aminophenoxy)benzene, 4,4'-bis(4-aminophenoxy)biphenyl, 4,4'-diaminobenzanilide, 9,9'-bis(4-aminophenyl)fluorene, o-tolidine sulfone, 1,3'-bis(4-aminophenoxy)-2,2-dimethylpropane, 2,2-bis[4-(4-aminophenoxy)phenyl]hexafluoropropane, 2,3,5,6-tetramethyl-1,4-phenylenediamine, 3,3',5,5'-tetramethylbenzidine, 1,5-bis(4-aminophenoxy)pentane, 4,4''-diamino-p-terphenyl, 1,4-bis-N,N'-(4'-aminophenyl)terephthalamide, N,N'-bis(4-aminobenzoyl)-p-phenylenediamine, bis[4-(4-aminophenoxy)phenyl]ketone, 4-aminophenyl-4-aminobenzoate, bis(4-aminophenoxy)terephthalate, 4,4'-biphenoxy-bis(4-aminobenzoate), and the like.

The content of the aromatic diamine in the monomer component is not particularly limited as long as it does not interfere with the object of the present invention. Regarding the content of the aromatic diamine in the monomer component, the amount of the below-mentioned tetracarboxylic dianhydride component is preferably 0.2 to 2 mol, and more preferably 0.3 to 1.2 mol, based on 1 mol of the aromatic diamine. In the tetracarboxylic dianhydride component, a tetracarboxylic dianhydride (B1) is inevitably included and another tetracarboxylic dianhydride other than the below-mentioned tetracarboxylic dianhydride (B1) is optionally included.

(Tetracarboxylic Dianhydride (B1))

The tetracarboxylic dianhydride (B1) is norbornane-2-spiro-α-cycloalkanone-α'-spiro-2"-norbornane-5,5",6,6"-tetracarboxylic dianhydride represented by the following formula (b1):

[Chem. 20]

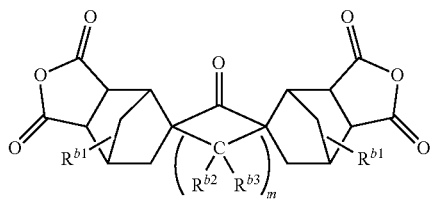

wherein, in the formula (b1), $R^{b1}$, $R^{b2}$, and $R^{b3}$ each independently represent one selected from the group consisting of a hydrogen atom, an alkyl group having 1 to 10 carbon atoms, and a fluorine atom, and m represents an integer of 0 to 12.

The alkyl group selectable as RID' in the formula (b1) is an alkyl group having 1 to 10 carbon atoms. When the number of carbon atoms of the alkyl group exceeds 10, the heat resistance of the thus obtained polyimide resin easily deteriorates. When $R^{b1}$ is an alkyl group, from the viewpoint of easily obtaining a polyimide resin having excellent heat resistance, the number of carbon atoms is preferably 1 to 6, more preferably 1 to 5, still more preferably 1 to 4, and particularly preferably 1 to 3. When $R^{b1}$ is an alkyl group, the alkyl group may be either linear or branched.

Since the thus obtained polyimide resin has excellent heat resistance, $R^{b1}$ in the formula (b1) each independently represent a hydrogen atom or an alkyl group having 1 to 10 carbon atoms, more preferably. Since the tetracarboxylic dianhydride component (B1) can be made available and purified easily, $R^{b1}$ in the formula (b1) is more preferably a hydrogen atom, a methyl group, an ethyl group, an n-propyl group, or an isopropyl group, and particularly preferably a hydrogen atom or a methyl group. Since the tetracarboxylic dianhydride component (B1) can be made available and purified easily, plural $R^{b1}$(s) in the formula (b1) are preferably the same groups.

m in the formula (b1) represents an integer of 0 to 12. When the value of m exceeds 12, it is difficult to purify the tetracarboxylic dianhydride component (B1). Since the tetracarboxylic dianhydride component (B1) can be purified easily, the upper limit of m is preferably 5, and more preferably 3. From the viewpoint of the chemical stability of the tetracarboxylic dianhydride component (B1), the lower limit of m is preferably 1, and more preferably 2. m in the formula (b1) is particularly preferably 2 or 3.

The alkyl group having 1 to 10 carbon atoms selectable as $R^{b2}$ and $R^{b3}$ in the formula (b1) is the same as an alkyl group having 1 to 10 carbon atoms selectable as $R^{b1}$. Since the tetracarboxylic dianhydride component (B1) can be purified easily, $R^{b2}$ and $R^{b3}$ are preferably hydrogen atoms, or alkyl groups having 1 to 10 carbon atoms (preferably 1 to 6 carbon atoms, more preferably 1 to 5 carbon atoms, still more preferably 1 to 4 carbon atoms, and particularly preferably 1 to 3 carbon atoms), and particularly preferably hydrogen atoms or methyl groups.

Examples of the tetracarboxylic dianhydride (B1) represented by the formula (b1) include norbornane-2-spiro-α-cyclopentanone-α'-spiro-2"-norbornane-5,5",6,6"-tetracarboxylic dianhydride (another name: "norbornane-2-spiro-2'-cyclopentanone-5'-spiro-2"-norbornane-5,5",6,6"-tetracarboxylic dianhydride"), methylnorbornane-2-spiro-α-cyclopentanone-α'-spiro-2"-(methylnorbornane)-5,5",6,6"-tetracarboxylic dianhydride, norbornane-2-spiro-α-cyclohexanone-α'-spiro-2"-norbornane-5,5",6,6"-tetracarboxylic dianhydride (another name: "norbornane-2-spiro-2'-cyclohexanone-6'-spiro-2"-norbornane-5,5",6,6"-tetracarboxylic dianhydride"), methylnorbornane-2-spiro-α-cyclohexanone-α'-spiro-2"-(methylnorbornane)-5,5",6,6"-tetracarboxylic dianhydride, norbornane-2-spiro-α-cyclopropanone-α'-spiro-2"-norbornane-5,5",6,6"-tetracarboxylic dianhydride, norbornane-2-spiro-α-cyclobutanone-α'-spiro-2"-norbornane-5,5",6,6"-tetracarboxylic dianhydride, norbornane-2-spiro-α-cycloheptanone-α'-spiro-2"-norbornane-5,5",6,6"-tetracarboxylic dianhydride, norbornane-2-spiro-α-cyclooctanone-α'-spiro-2"-norbornane-5,5",6,6"-tetracarboxylic dianhydride, norbornane-2-spiro-α-cyclononanone-α'-spiro-2"-norbornane-5,5",6,6"-tetracarboxylic dianhydride, norbornane-2-spiro-α-cyclodecanone-α'-spiro-2"-norbornane-5,5",6,6"-tetracarboxylic dianhydride, norbornane-2-spiro-α-cycloundecanone-α'-spiro-2"-norbornane-5,5",6,6"-tetracarboxylic dianhydride, norbornane-2-spiro-α-cyclododecanone-α'-spiro-2"-norbornane-5,5",6,6"-tetracarboxylic dianhydride, norbornane-2-spiro-α-cyclotridecanone-α'-spiro-2"-norbornane-5,5",6,6"-tetracarboxylic dianhydride, norbornane-2-spiro-α-cyclotetradecanone-α'-spiro-2"-norbornane-5,5",6,6"-tetracarboxylic dianhydride, norbornane-2-spiro-α-cyclopentadecanone-α'-spiro-2"-norbornane-5,5",6,6"-tetracarboxylic dianhydride, norbornane-2-spiro-α-(methylcyclopentanone)-α'-spiro-2"-norbornane-5,5",6,6"-tetracarboxylic dianhydride, norbornane-2-spiro-α-(methylcyclohexanone)-α'-spiro-2"-norbornane-5,5",6,6"-tetracarboxylic dianhydride, and the like.

From the viewpoint of the adjustment of film properties, thermophysical properties, mechanical properties, optical properties, and electrical properties, the tetracarboxylic dianhydride represented by the formula (b1) preferably contains at least one of a compound (B1-1) represented by the following formula (b1-1):

[Chem. 21]

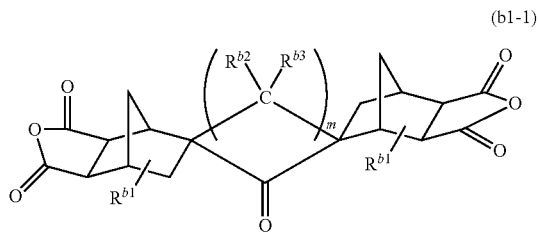

wherein, in the formula (b1-1), $R^{b1}$, $R^{b2}$, $R^{b3}$, and m are the same as $R^{b1}$, $R^{b2}$, $R^{b3}$, and m defined in the formula (b1), and a compound (B1-2) represented by the following formula (b1-2):

[Chem. 22]

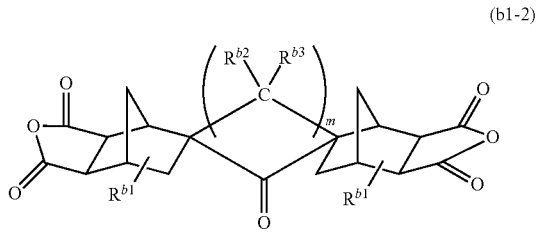

(b1-2)

wherein, in the formula (b1-2), $R^{b1}$, $R^{b2}$, $R^{b3}$, and m are the same as $R^{b1}$, $R^{b2}$, $R^{b3}$, and m defined in the formula (b1), and the total amount of the compound (B1-1) and the compound (B1-2) relative to the total mol number of tetracarboxylic dianhydride is preferably 30 mol % or more.

The compound (B1-1) represented by the formula (b1-1) is an isomer of tetracarboxylic dianhydride represented by the formula (b1) in which two norbornane groups are trans-configured and a carbonyl group of a cycloalkanone is configured at the end to each of two norbornane groups. The compound (B1-2) represented by the formula (b1-2) is an isomer of tetracarboxylic dianhydride represented by the formula (b1) in which two norbornane groups are cis-configured and a carbonyl group of a cycloalkanone is configured at the end to each of two norbornane groups. The method for producing a tetracarboxylic dianhydride containing such an isomer at the above ratio is not particularly limited, and a known method can be appropriately employed and, for example, the method mentioned in WO 2014/034760 A may be appropriately employed.

As mentioned later, the monomer component may include another tetracarboxylic dianhydride other than the tetracarboxylic dianhydride (B1). A ratio of the amount of the tetracarboxylic dianhydride (B1) to the total amount of the tetracarboxylic dianhydride component, which is the total of the amount of the tetracarboxylic dianhydride (B1) and the amount of another tetracarboxylic dianhydride, is typically 50% by mass or more, preferably 70% by mass or more, more preferably 90% by mass or more, and particularly preferably 100% by mass. A relationship between the amount of the tetracarboxylic dianhydride component and the amount of the diamine component is as mentioned above.

(Another Tetracarboxylic Dianhydride)

The monomer component may include another tetracarboxylic dianhydride other than the tetracarboxylic dianhydride (B1), together with the tetracarboxylic dianhydride (B1), as long as it does not interfere with the object of the present invention.

Suitable examples of another tetracarboxylic dianhydrides include aliphatic or alicyclic tetracarboxylic dianhydrides such as butanetetracarboxylic dianhydride, 1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic dianhydride, bicyclo[2.2.2]-oct-7-ene-2,3,5,6-tetracarboxylic dianhydride, bicyclo[2.2.1]-heptane-2,3,5,6-tetracarboxylic dianhydride, (4H,8H)-decahydro-1,4:5,8-dimethanonaphthalene-2,3,6,7-tetracarboxylic dianhydride, and pentacyclo[9.2.1.1$^{4,7}$.0$^{2,10}$.0$^{3,8}$]-pentadecane-5,6,12,13-tetracarboxylic dianhydride; and aromatic tetracarboxylic dianhydrides such as pyromellitic dianhydride, 3,3',4,4'-benzophenonetetracarboxylic dianhydride, 3,3',4,4'-biphenyl sulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidenediphthalic dianhydride, 4,4'-(2,2-hexafluoroisopropylidene)diphthalic dianhydride, 3,3',4,4'-biphenyltetracarboxylic dianhydride, 2,3,3',4'-biphenyltetracarboxylic dianhydride, bis(phthalic acid) phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenylether dianhydride, and bis(triphenylphthalic acid)-4,4'-diphenylmethane dianhydride. When using an aromatic tetracarboxylic dianhydride, in order to prevent coloration of the film to be formed, it is preferred to appropriately change the use amount thereof so that the film to be formed can have sufficient transparency.

It is possible to use, as another resin precursor component, a compound represented by the following formula (Si-1). The addition of the compound represented by the formula (Si-1) enables an improvement in total light transmittance and Haze of the thus obtained polyimide film.

[Chem. 23]

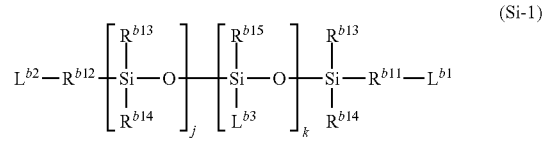

(Si-1)

In the formula, $R^{b11}$ and $R^{b12}$ each independently represent a single bond or a methylene group, an alkylene group having 2 to 20 carbon atoms, a cycloalkylene group having 3 to 20 carbon atoms, or an arylene group having 6 to 20 carbon atoms; $R^{b13}$, $R^{b14}$, and $R^{b15}$ each independently represent a monovalent hydrocarbon group having 1 to 20 carbon atoms, an amino group having 1 to 20 carbon atoms, a group represented by —O—$R^{b16}$ ($R^{b16}$ is a hydrocarbon group having 1 to 20 carbon atoms), or an organic group having 2 to 20 carbon atoms and having one or more epoxy groups;

$L^{b1}$, $L^{b2}$, and $L^{b3}$ each independently represent an amino group, an isocyanate group, a carboxyl group, an acid anhydride group, a carboxylic acid ester group, a carboxylic acid halide group, a hydroxy group, an organic group having 2 to 20 carbon atoms and having one or more epoxy groups, or a mercapto group; and j is an integer of 3 to 200 and k is an integer of 0 to 197.

In the formula (Si-1), from the viewpoint of the heat resistance and residual stress, the alkylene group having 2 to 20 carbon atoms in $R^{b11}$ and $R^{b12}$ is preferably an alkylene group having 2 to 10 carbon atoms, and examples thereof include a dimethylene group, a trimethylene group, a tetramethylene group, a pentamethylene group, a hexamethylene group, and the like.

From the above viewpoint, the cycloalkylene group having 3 to 20 carbon atoms is preferably a cycloalkylene group having 3 to 10 carbon atoms, and examples thereof include a cyclobutylene group, a cyclopentylene group, a cyclohexylene group, a cycloheptylene group, and the like. From the above viewpoint, the arylene group having 6 to 20 carbon atoms is preferably an aromatic group having 3 to 20 carbon atoms, and examples thereof include a phenylene group, a naphthylene group, and the like.

In the formula (Si-1), from the viewpoint of the heat resistance and residual stress, the alkyl group having 1 to 20 carbon atoms in $R^{b13}$, $R^{b14}$, and $R^{b15}$ is preferably an alkyl group having 1 to 10 carbon atoms, and specific examples thereof include a methyl group, an ethyl group, a propyl group, an isopropyl group, a butyl group, an isobutyl group, a tert-butyl group, a pentyl group, a hexyl group, and the like. From the above viewpoint, the cycloalkyl group having 3 to 20 carbon atoms is preferably a cycloalkyl group having 3 to 10 carbon atoms, and specific examples thereof include a cyclopentyl group, a cyclohexyl group, and the like. From the above viewpoint, the aryl group having 6 to 20 carbon atoms is preferably an aryl group having 6 to 12 carbon atoms, and specific examples thereof include a phenyl group, a tolyl group, a naphthyl group, and the like. Examples of the amino group having 1 to 20 carbon atoms include an amino group, a substituted amino group (e.g., bis(trialkylsilyl)amino group), and the like. Examples of the group represented by —O—$R^{b16}$ include a methoxy group, an ethoxy group, a propoxy group, an isopropyloxy group, a buthoxy group, a phenoxy group, a tolyloxy group, a naphthyloxy group, a propenyloxy group (e.g., allyloxy group), and a cyclohexyloxy group. Among these, $R^{b13}$, $R^{b14}$, and $R^{b15}$ are preferably methyl groups, ethyl groups, propyl groups, and phenyl groups.

In the formula (Si-1), the amino group in $L^{b1}$, $L^{b2}$, and $L^{b3}$ may be substituted and includes, for example, a bis(trialkylsilyl)amino group. When $L^{b1}$, $L^{b2}$, and $L^{b3}$ are amino groups, preferred is a compound represented by the following formula (Si-2):

[Chem. 24]

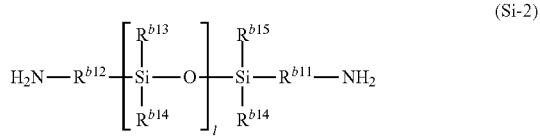

(Si-2)

wherein $R^{b11}$ to $R^{b14}$ are the same as those defined above, and l is an integer of 3 to 50.

Specific examples of the compounds represented by the formula (Si-2) include both-end amino-modified methyl phenyl silicone (e.g., X-22-1660B-3 (number average molecular weight of 4,400) and X-22-9409 (number average molecular weight of 1,300) manufactured by Shin-Etsu Chemical Co., Ltd.), both-end amino-modified dimethyl silicone (e.g., X-22-161A (number average molecular weight of 1,600), X-22-161B (number average molecular weight of 3,000), and KF8012 (number average molecular weight of 4,400) manufactured by Shin-Etsu Chemical Co., Ltd.); BY16-835U (number average molecular weight of 900) manufactured by Dow Corning Toray Co., Ltd.; and Silaplane FM3311 manufactured by JNC Corporation (number average molecular weight of 1,000). Among these, from the viewpoint of improving the chemical resistance and improving Tg, both-end amine-modified methyl phenyl silicone oil is particularly preferable.

Specific examples of the compound in which $L^{b1}$, $L^{b2}$, and $L^{b3}$ are isocyanate groups include isocyanate-modified silicone obtained by reacting the both-end amino-modified silicone with a phosgene compound. Specific examples of the compound in which $L^{b1}$, $L^{b2}$, and $L^{b3}$ are carboxyl groups include X-22-162C (number average molecular weight of 4,600) manufactured by Shin-Etsu Chemical Co., Ltd.; and BY16-880 (number average molecular weight of 6,600) manufactured by Dow Corning Toray Co., Ltd. When $L^{b1}$, $L^{b2}$, and $L^{b3}$ are acid anhydride groups, a phthalic anhydride group and a maleic anhydride group are preferable. Specific examples thereof include X-22-168AS (manufactured by Shin-Etsu Chemical Co., Ltd., number average molecular weight of 1,000), X-22-168A (manufactured by Shin-Etsu Chemical Co., Ltd., number average molecular weight of 2,000), X-22-168B (manufactured by Shin-Etsu Chemical Co., Ltd., number average molecular weight of 3,200), X-22-168-P5-8 (manufactured by Shin-Etsu Chemical Co., Ltd., number average molecular weight of 4,200), DMS-Z21 (manufactured by Gelest, Inc., number average molecular weight of 600 to 800), and the like. Specific examples of the compound in which $L^{b1}$, $L^{b2}$, and $L^{b3}$ are carboxylic acid ester groups include a compound obtained by reacting the compound in which $L^{b1}$, $L^{b2}$, and $L^{b3}$ are carboxyl groups or acid anhydride groups with an alcohol. Specific examples of the compound in which $L^{b1}$, $L^{b2}$, and $L^{b3}$ are carboxylic acid halide groups include carboxylic acid chloride, carboxylic acid fluoride, carboxylic acid bromide, carboxylic acid iodide, and the like. Specific examples of the compound in which $L^{b1}$, $L^{b2}$, and $L^{b3}$ are organic groups having 2 to 20 carbon atoms and having one or more epoxy groups include both-end epoxy type compounds such as X-22-163 (manufactured by Shin-Etsu Chemical Co., Ltd., number average molecular weight of 400), KF-105 (manufactured by Shin-Etsu Chemical Co., Ltd., number average molecular weight of 980), X-22-163A (manufactured by Shin-Etsu Chemical Co., Ltd., number average molecular weight of 2,000), X-22-163B (manufactured by Shin-Etsu Chemical Co., Ltd., number average molecular weight of 3,500), and X-22-163C (manufactured by Shin-Etsu Chemical Co., Ltd., number average molecular weight of 5,400); both-end alicyclic epoxy type compounds such as X-22-169AS (manufactured by Shin-Etsu Chemical Co., Ltd., number average molecular weight of 1,000) and X-22-169B (manufactured by Shin-Etsu Chemical Co., Ltd., number average molecular weight of 3,400); and side-chain both-end epoxy type compound such as X-22-9002 (manufactured by Shin-Etsu Chemical Co., Ltd., functional group equivalent: 5,000 g/mol). It is considered that a compound having an epoxy group reacts with a diamine. Specific examples of the compound in which $L^{b1}$, $L^{b2}$, and $L^{b3}$ are mercapto groups include X-22-167B (manufactured by Shin-Etsu Chemical Co., Ltd., number average molecular weight of 3,400), X-22-167C (manufactured by Shin-Etsu Chemical Co., Ltd., number average molecular weight of 4,600), and the like. It is considered that a compound having a mercapto group reacts with a compound having a carboxyl group or an acid anhydride group. Among these, from the viewpoint of improving the molecular weight of a resin precursor and improving the heat resistance of the thus obtained polyimide, $L^{b1}$, $L^{b2}$, and $L^{b3}$ are preferably each independently an amino group or an acid anhydride group, and more preferably each independently an amino group. When k=0, suitable combinations of $L^{b1}$, and $L^{b2}$ are the same as those defined above.

In the formula (Si-1), j is an integer of 3 to 200, preferably an integer of 10 to 200, more preferably an integer of 20 to 150, still more preferably an integer of 30 to 100, and particularly preferably an integer of 35 to 80. By setting to be within the above range, the cloudness of the polyimide precursor composition is suppressed, thus maintaining the mechanical strength of the thus obtained polyimide film.

In the formula (Si-1), k is an integer of 0 to 197, preferably 0 to 100, still more preferably 0 to 50, and particularly preferably 0 to 25. By setting to be within the above range, when k is 197 or less, the cloudness of the polyimide precursor composition is suppressed during preparation of a polyimide precursor composition containing a resin precursor and a solvent. From the viewpoint of an improvement in molecular weight of the resin precursor and the heat resistance of the thus obtained polyimide, k is preferably 0. When k is 0, from the viewpoint of an improvement in molecular weight of the resin precursor and the heat resistance of the thus obtained polyimide, j is preferably 3 to 200.

The content of the compound represented by the formula (Si-1) may be appropriately adjusted, for example, in a range of 0.1 to 5 mol based on 1 mol of the tetracarboxylic dianhydride component.

[Polyamic Acid]

The polyamic acid includes a repeating unit represented by the following formula (b2):

[Chem. 25]

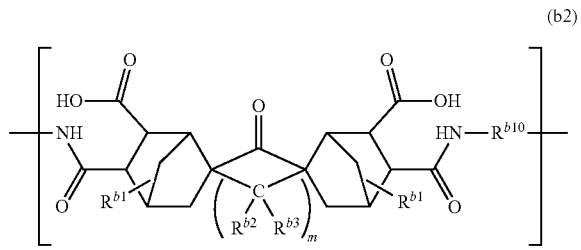

(b2)

wherein, in the formula (b2), $R^{b1}$, $R^{b2}$, and $R^{b3}$ each independently represent one selected from the group consisting of a hydrogen atom, an alkyl group having 1 to 10 carbon atoms, and a fluorine atom, $R^{b10}$ represents an aryl group having 6 to 40 carbon atoms, and m represents an integer of 0 to 12.

There is no particular limitation on the method for producing a polyamic acid. The polyamic acid is typically produced by a reaction of the above-mentioned diamine compound with a tetracarboxylic dianhydride component. The polyamic acid preferably includes a unit derived from the above-mentioned compound (B1-1) and a diamine compound, and a unit derived from a compound (B1-2) with a diamine compound in the same molar ratio as that of the compound (B1-1) to the compound (B1-2).

When the polyamic acid is synthesized, a ratio of a diamine compound to a tetracarboxylic dianhydride component is the same as that of a diamine compound to a tetracarboxylic dianhydride component described about a monomer component.

The reaction of the tetracarboxylic dianhydride component with the diamine compound is usually performed in an organic solvent. The organic solvent to be used in the reaction of the tetracarboxylic dianhydride component with the diamine compound is not particularly limited as long as it is an organic solvent which can dissolve the diamine compound and the tetracarboxylic dianhydride component, and does not react with the diamine compound and the tetracarboxylic dianhydride component. These organic solvents can be used alone, or two or more organic solvents can be used in combination.

It is possible to preferably use, as an organic solvent to be used in a reaction of tetracarboxylic dianhydride with a diamine compound, for example, the below-mentioned solvent (S). Among these organic solvents, nitrogen-containing polar solvents such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea are preferable in view of the solubility of polyamic acid to be produced in the solvent (S).

During the synthesis of the polyamic acid, the organic solvent is used in an amount so that the total mass of the tetracarboxylic dianhydride component and the diamine compound is 0.1% to 50% by mass, and preferably 10 to 30% by mass, in the reaction solution.

When reacting the tetracarboxylic dianhydride component with the diamine compound, a base compound may be further added in the organic solvent in view of improving the reaction rate and obtaining a polyamic acid with high polymerization degree. Examples of the basic compound include, but are not particularly limited to, triethylamine, tetrabutylamine, tetrahexylamine, 1,8-diazabicyclo[5.4.0]-undecene-7, pyridine, isoquinoline, α-picoline, and the like. The use amount of the base compound is preferably 0.001 to 10 equivalents, and more preferably 0.01 to 0.1 equivalent, based on 1 equivalent of the tetracarboxylic dianhydride component.

The reaction temperature, at which the tetracarboxylic dianhydride component is reacted with the diamine compound, is not particularly limited as long as the reaction satisfactorily proceeds, but is preferably 15 to 30° C. The reaction is preferably performed under an inert gas atmosphere. The reaction time is also not particularly limited, but is preferably, for example, 10 to 48 hours.

<Solvent (S)>

The polyimide precursor composition according to the present invention contains a solvent (S). The polyimide precursor composition may be a paste containing a solid or a solution as long as it can form a film. In view of easily forming a uniform and smooth film, the polyimide precursor composition is preferably a solution. Solvents can be used alone, or two or more solvents can be used in combination.

There is no particular limitation on the type of the solvent (S) as long as it does not interfere with the object of the present invention. Examples of suitable solvent (S) include nitrogen-containing polar solvents such as N-methyl-2-pyrrolidone (NMP), N,N-dimethylacetamide (DMAc), N,N-dimethylisobutylamide, N,N-diethylacetamide, N,N-dimethylformamide (DMF), N,N-diethylformamide, N-methylcaprolactam, 1,3-dimethyl-2-imidazolidinone (DMI), pyridine, and N,N,N',N'-tetramethylurea (TMU); lactone-based polar solvents such as β-propiolactone, γ-butyrolactone, γ-valerolactone, δ-valerolactone, γ-caprolactone, and ε-caprolactone; dimethyl sulfoxide; hexamethylphosphoric tripamides; acetonitrile; fatty acid esters such as ethyl lactate and butyl lactate; ethers such as diethylene glycol dimethyl ether, diethylene glycol diethyl ether, dioxane, tetrahydrofuran, methyl cellosolve acetate, and ethyl cellosolve acetate, glyme; and aromatic solvents such as benzene, toluene, and xylene.

The solvent preferably contains a compound represented by the following formula (S1):

[Chem. 26]

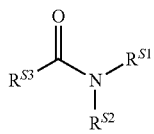
(S1)

wherein, in the formula (S1), $R^{S1}$, and $R^{S2}$ each independently represent an alkyl group having 1 to 3 carbon atoms, and $R^{S3}$ is a group represented by the following formula (S1-1) or the following formula (S1-2).

[Chem. 27]

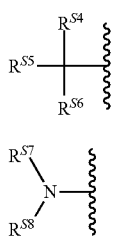
(S1-1)

(S1-2)

In the formula (S1-1), $R^{S4}$ is a hydrogen atom or a hydroxyl group, and $R^{S5}$ and $R^{S6}$ each independently represent an alkyl group having 1 to 3 carbon atoms. In the formula (S1-2), $R^{S7}$ and $R^{S8}$ each independently represent a hydrogen atom or alkyl group having 1 to 3 carbon atoms.

Among compounds represented by the formula (S1), specific examples of the compound in which $R^{S3}$ is a group represented by the formula (S1-1) include N,N,2-trimethylpropionamide, N-ethyl,N,2-dimethylpropionamide, N,N-diethyl-2-methylpropionamide, N,N,2-trimethyl-2-hydroxypropionamide, N-ethyl-N,2-dimethyl-2-hydroxypropionamide, and N,N-diethyl-2-hydroxy-2-methylpropionamide.

Among compounds represented by the formula (S1), specific examples of the compound in which $R^{S3}$ is a group represented by the formula (S1-2) include N,N,N',N'-tetramethylurea, N,N,N',N'-tetraethylurea, and the like.

Among compounds represented by the formula (S1), particularly preferable compound is preferably N,N,2-trimethylpropionamide and N,N,N',N'-tetramethylurea. A boiling point of N,N,2-trimethylpropionamide under atmospheric pressure is 175° C., and a boiling point of N,N,N',N'-tetramethylurea under atmospheric pressure is 177° C. In this way, N,N,2-trimethylpropionamide and N,N,N',N'-tetramethylurea have comparatively low boiling point among solvents capable of dissolving a monomer component and a polyamic acid. Therefore, when using a polyimide precursor composition containing a solvent (S) which contains at least one selected from N,N,2-trimethylpropionamide and N,N,N',N'-tetramethylurea, the solvent hardly remains in the thus formed polyimide film during heating upon formation of the polyimide film, so that deterioration of the tensile elongation of the thus obtained polyimide film hardly occurs.

Furthermore, N,N,2-trimethylpropionamide and N,N,N',N'-tetramethylurea are also useful since they are not designated as a substance of very high concern (SVHC), which is a substance of hazard concern in REACH regulation of the European Union (EU), and are less hazardous substances.

There is no particular limitation on the content of the compound represented by the formula (S1) in the solvent (S) as long as it does not interfere with the object of the present invention. Typically, a ratio of the compound represented by the formula (S1) relative to the mass of the solvent is preferably 70% by mass or more, more preferably 80% by mass or more, particularly preferably 90% by mass or more, and most preferably 100% by mass.

There is no particular limitation on the content of solvent (S) in the polyimide precursor as long as it does not interfere with the object of the present invention. The content of solvent (S) in the polyimide precursor polyimide precursor composition is appropriately adjusted according to the solid content. The solid content in the polyimide precursor composition is, for example, 1 to 80% by mass, preferably 5 to 70% by mass, and more preferably 10 to 60% by mass.

<Another Component>

The polyimide precursor composition according to the present invention may include, in addition to the above-mentioned components, another component as long as it does not interfere with the object of the present invention. Examples of another component include base generator components, polymerizable components such as a monomer, surfactants, plasticizers, viscosity modifiers, defoamers, and colorants.

<Silicon-Containing Compound>

The polyimide precursor composition according to the present invention may include, in addition to the above-described components, one or more silicon-containing compounds selected from the group consisting of a silicon-containing resin, a silicon-containing resin precursor, and a silane coupling agent. Examples of the silicon-containing resin include a siloxane resin or a polysilane. Examples of the silicon-containing resin precursor include a siloxane resin, or a silane compound which serves as a raw monomer of the polysilane.

When the polyimide precursor composition includes a silicon-containing compound, the adhesion between a polyimide precursor composition or a polyimide resin formed by using the polyimide precursor composition, and the object to be coated is satisfactory. This effect is significantly exerted when the material of the object to be coated is glass. Since it is possible to adhere to the object to be coated, a process margin of formation of a polyimide film is improved. When the polyimide precursor composition includes a silicon-containing compound, even if an exposure dose of UV laser is increased so as to improve the peelability of the polyimide film from the object to be coated or base material during peeling step by the below-mentioned UV laser, the cloudiness during peeling is easily suppressed.

Whether the silicon-containing compound should be added to the polyimide precursor composition, or the use amount of the silicon-containing compound is appropriately determined according to applications of the polyimide film formed by using the polyimide precursor composition. For example, when the below-mentioned laser peeling step is not provided, it is preferred that, as the adhesion between a polyimide film and a base material such as a substrate decreases, it is easy to peel the polyimide film from the base material. In this case, it is preferred that no silicon-containing compound is added to the polyimide precursor composition or a small amount of a silicon-containing compound is added to the polyimide precursor composition. Meanwhile, when the laser peeling step is provided, it is desirable that a film of a polyimide precursor composition or a polyimide film is not peeled off from a base material during a processing process. In this case, in view of being capable of enlarging a process margin, it is preferred to positively add a silicon-containing composition to a polyimide precursor composition to thereby enhance the adhesion of a film of a polyimide precursor composition or a polyimide film to a base material.

A siloxane resin, a polysilane, and a silane coupling agent will be described in order below.

[Siloxane Resin]

The siloxane resin is not particularly limited as long as it is a resin which is soluble in a solvent (S). The siloxane resin may also be a siloxane resin obtained by hydrolyzing and condensing a silane compound composition containing at least one or more silane compounds selected from a silane compound describe below.

It is possible to suitably use, as the siloxane resin, for example, a siloxane resin obtained by hydrolysis condensation of at least one selected from silane compounds represented by the following formula (c1):

$$(R^{c1})_{4-p}Si(OR^{c2})_p \qquad (c1)$$

wherein, in the formula (c1), $R^{c1}$ represents a hydrogen atom, an alkyl group, an alkenyl group, an aryl group, or an aralkyl group, $R^{c2}$ represents an alkyl group or a phenyl group, and p represents an integer of 2 to 4. When plural $R^{c1}$(s) are bonded to Si, the plural $R^{c1}$(s) may be the same or different. Plural $(OR^{c2})$(s) groups bonded to Si may be the same or different.

The alkyl group as $R^{c1}$ is preferably a linear or branched alkyl group having 1 to 20 carbon atoms, and more preferably a linear or branched alkyl group having 1 to 4 carbon atoms. The alkenyl group as $R^{c1}$ is preferably a linear or branched alkenyl group having 2 to 20 carbon atoms, and more preferably a linear or branched alkenyl group having 2 to 4 carbon atoms.

When $R^{c1}$ is an aryl group or an aralkyl group, an aryl group included in these groups is not particularly limited as long as it does not interfere with the object of the present invention. Suitable examples of the aryl group include the following groups.

[Chem. 28]

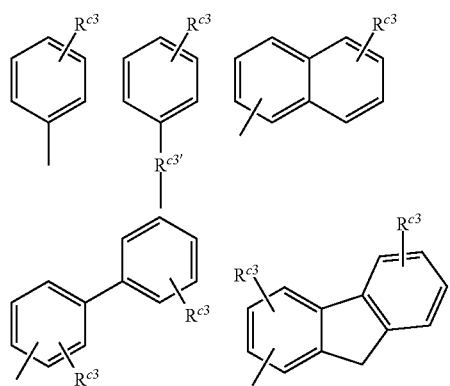

-continued

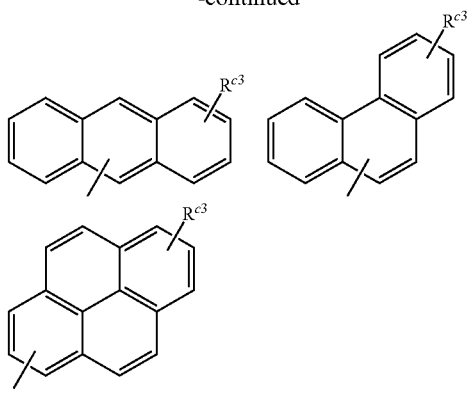

Among groups of the above formulas, groups of the following groups are preferable.

[Chem. 29]

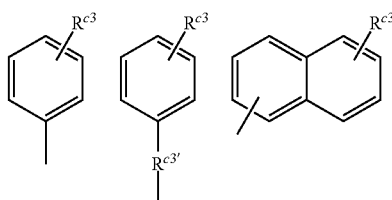

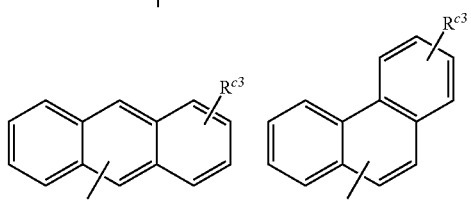

In the above formulas, $R^{c3}$ is a hydrogen atom; a hydroxyl group; an alkoxy group such as a methoxy group, an ethoxy group, a buthoxy group, or a propoxy group; or a hydrocarbon group such as a methyl group, an ethyl group, a butyl group, or a propyl group. In the above formulas, $R^{c3'}$ is an alkylene group such as a methylene group, an ethylene group, a propylene group, or a butylene group.

When $R^{c1}$ is an aryl group or an aralkyl group, suitable specific examples thereof include a benzyl group, a phenethyl group, a phenyl group, a naphthyl group, an anthracenyl group, a phenanthryl group, a biphenylyl group, a fluorenyl group, a pyrenyl group, and the like.

The number of benzene rings included in the aryl group or aralkyl group is preferably 1 to 3. When the number of benzene rings is 1 to 3, because of satisfactory productivity of a siloxane resin, volatilization during baking is suppressed by an increase in polymerization degree of the siloxane resin. Therefore, it is easy to form a polyimide film. The aryl group or aralkyl group may have a hydroxyl group as a substituent.

The alkyl group as $R^{c2}$ is preferably a linear or branched alkyl group having 1 to 5 carbon atoms. Particularly, the alkyl group as $R^{c2}$ preferably has 1 or 2 carbon atoms in view of a hydrolysis rate. When p in the formula (c1) is 4, a silane compound (i) is represented by the following formula (c2).

$$Si(OR^{c4})_a(OR^{c5})_b(OR^{c6})_c(OR^{c7})_d \qquad (c2)$$

In the formula (c2), $R^{c4}$, $R^{c5}$, $R^{c6}$, and $R^{c7}$ each independently represent an alkyl group or a phenyl group, which is the same as that for the above $R^{c2}$.

a, b, c, and d are integers which satisfy the conditions: $0 \le a \le 4$, $0 \le b \le 4$, $0 \le c \le 4$, $0 \le d \le 4$, and a+b+c+d=4.

When n in the formula (c1) is 3, a silane compound (ii) is represented by the following formula (c3).

In the formula (c3), $R^{c8}$ represents a hydrogen atom, or an alkyl group, an aryl group, or an aralkyl group, which is the same as that for the above $R^{c1}$. $R^{c9}$, $R^{c10}$, and $R^{c11}$ each independently represent an alkyl group or a phenyl group, which is the same as that for the above $R^{c2}$.

e, f, and g are integers which satisfy the conditions: $0 \le e \le 3$, $0 \le f \le 3$, $0 \le g \le 3$, and e+f+g=3.

When n in the formula (c1) is 2, a silane compound (iii) is represented by the following formula (c4).

In the formula (c4), $R^{c12}$, and $R^{c13}$ represent a hydrogen atom, or an alkyl group, an aryl group, or an aralkyl group, which is the same as that for the above R. $R^{c14}$ and $R^{c15}$ each independently represent an alkyl group or a phenyl group, which is the same as that for the above $R^{c2}$.

h and i are integers which satisfy the conditions: $0 \le h \le 2$, $0 \le i \le 2$, and h+i=2.

Specific examples of the silane compound (i) include tetraalkoxysilanes such as tetramethoxysilane, tetraethoxysilane, tetrapropoxysilane, tetrabutoxysilane, tetrapentyloxysilane, tetraphenyloxysilane, trimethoxymonoethoxysilane, dimethoxydiethoxysilane, triethoxymonomethoxysilane, trimethoxymonopropoxysilane, monomethoxytributhoxysilane, monomethoxytripentyloxysilane, monomethoxytriphenyloxysilane, dimethoxydipropoxysilane, tripropoxymonomethoxysilane, trimethoxymonobuthoxysilane, dimethoxydibuthoxysilane, triethoxymonopropoxysilane, diethoxydipropoxysilane, tributhoxymonopropoxysilane, dimethoxymonoethoxymonobuthoxysilane, diethoxymonomethoxymonobuthoxysilane, diethoxymonopropoxymonobuthoxysilane, dipropoxymonomethoxymonoethoxysilane, dipropoxymonomethoxymonobuthoxysilane, dipropoxymonoethoxymonobuthoxysilane, dibuthoxymonomethoxymonoethoxysilane, dibuthoxymonoethoxymonopropoxysilane, and monomethoxymonoethoxymonopropoxymonobuthoxysilane and, among these, tetramethoxysilane and tetraethoxysilane are preferable.

Specific examples of the silane compound (ii) include: hydrosilane compounds such as trimethoxysilane, triethoxysilane, tripropoxysilane, tripentyloxysilane, triphenyloxysilane, dimethoxymonoethoxysilane, diethoxymonomethoxysilane, dipropoxymonomethoxysilane, dipropoxymonoethoxysilane, dipentyloxylmonomethoxysilane, dipentyloxymonoethoxysilane, dipentyloxymonopropoxysilane, diphenyloxylmonomethoxysilane, diphenyloxymonoethoxysilane, diphenyloxymonopropoxysilane, methoxyethoxypropoxysilane, monopropoxydimethoxysilane, monopropoxydiethoxysilane, monobuthoxydimethoxysilane, monopentyloxydiethoxysilane, and monophenyloxydiethoxysilane; methylsilane compounds such as methyltrimethoxysilane, methyltriethoxysilane, methyltripropoxysilane, methyltripentyloxysilane, methyltriphenyloxysilane, methylmonomethoxydiethoxysilane, methylmonomethoxydipropoxysilane, methylmonomethoxydipentyloxysilane, methylmonomethoxydiphenyloxysilane, methylmethoxyethoxypropoxysilane, and methylmonomethoxymonoethoxymonobuthoxysilane; ethylsilane compounds such as ethyltrimethoxysilane, ethyltriethoxysilane, ethyltripropoxysilane, ethyltripentyloxysilane, ethyltriphenyloxysilane, ethylmonomethoxydiethoxysilane, ethylmonomethoxydipropoxysilane, ethylmonomethoxydipentyloxysilane, ethylmonomethoxydiphenyloxysilane, ethylmethoxyethoxypropoxysilane, and ethylmonomethoxymonoethoxymonobuthoxysilane; propylsilane compounds such as propyltrimethoxysilane, propyltriethoxysilane, propyltripropoxysilane, propyltripentyloxysilane, and propyltriphenyloxysilane, propylmonomethoxydiethoxysilane, propylmonomethoxydipropoxysilane, propylmonomethoxydipentyloxysilane, propylmonomethoxydiphenyloxysilane, propylmethoxyethoxypropoxysilane, and propylmonomethoxymonoethoxymonobuthoxysilane; butylsilane compounds such as butyltrimethoxysilane, butyltriethoxysilane, butyltripropoxysilane, butyltripentyloxysilane, butyltriphenyloxysilane, butylmonomethoxydiethoxysilane, butylmonomethoxydipropoxysilane, butylmonomethoxydipentyloxysilane, butylmonomethoxydiphenyloxysilane, butylmethoxyethoxypropoxysilane, and butylmonomethoxymonoethoxymonobuthoxysilane; phenylsilane compounds such as phenyltrimethoxysilane, phenyltriethoxysilane, phenyltripropoxysilane, phenyltripentyloxysilane, phenyltriphenyloxysilane, phenylmonomethoxydiethoxysilane, phenylmonomethoxydipropoxysilane, phenylmonomethoxydipentyloxysilane, phenylmonomethoxydiphenyloxysilane, phenylmethoxyethoxypropoxysilane, and phenylmonomethoxymonoethoxymonobuthoxysilane; hydroxyphenylsilane compounds such as hydroxyphenyltrimethoxysilane, hydroxyphenyltriethoxysilane, hydroxyphenyltripropoxysilane, hydroxyphenyltripentyloxysilane, hydroxyphenyltriphenyloxysilane, hydroxyphenylmonomethoxydiethoxysilane, hydroxyphenylmonomethoxydipropoxysilane, hydroxyphenylmonomethoxydipentyloxysilane, hydroxyphenylmonomethoxydiphenyloxysilane, hydroxyphenylmethoxyethoxypropoxysilane, and hydroxyphenylmonomethoxymonoethoxymonobuthoxysilane; naphthylsilane compounds such as naphthyltrimethoxysilane, naphthyltriethoxysilane, naphthyltripropoxysilane, naphthyltripentyloxysilane, naphthyltriphenyloxysilane, naphthylmonomethoxydiethoxysilane, naphthylmonomethoxydipropoxysilane, naphthylmonomethoxydipentyloxysilane, naphthylmonomethoxydiphenyloxysilane, naphthylmethoxyethoxypropoxysilane, and naphthylmonomethoxymonoethoxymonobuthoxysilane; benzylsilane compounds such as benzyltrimethoxysilane, benzyltriethoxysilane, benzyltripropoxysilane, benzyltripentyloxysilane, benzyltriphenyloxysilane, benzylmonomethoxydiethoxysilane, benzylmonomethoxydipropoxysilane, benzylmonomethoxydipentyloxysilane, benzylmonomethoxydiphenyloxysilane, benzylmethoxyethoxypropoxysilane, and benzylmonomethoxymonoethoxymonobuthoxysilane; and hydroxybenzylsilane compounds such as hydroxybenzyltrimethoxysilane, hydroxybenzyltriethoxysilane, hydroxybenzyltripropoxysilane, hydroxybenzyltripentyloxysilane, hydroxybenzyltriphenyloxysilane, hydroxybenzylmonomethoxydiethoxysilane, hydroxybenzylmonomethoxydipropoxysilane, hydroxybenzylmonomethoxydipentyloxysilane, hydroxybenzylmonomethoxydiphenyloxysilane, hydroxybenzylmethoxyethoxypropoxysilane, and hydroxybenzylmonomethoxymonoethoxymonobuthoxysilane.

Specific examples of the silane compound (iii) include: hydrosilane compounds such as dimethoxysilane, diethoxysilane, dipropoxysilane, dipentyloxysilane, diphenyloxysilane, methoxyethoxysilane, methoxypropoxysilane, methoxypentyloxysilane, methoxyphenyloxysilane, ethoxypropoxysilane, ethoxypentyloxysilane, and ethoxyphenyloxysilane; methylhydrosilane compounds such as methyldimethoxysilane, methylmethoxyethoxysilane, methyldiethoxysilane, methylmethoxypropoxysilane, methylmethoxypentyloxysilane, methylethoxypropoxysilane, methyldipropoxysilane, methyldipentyloxysilane, methyldiphenyloxysilane, and methylmethoxyphenyloxysilane; ethylhydrosilane compounds such as ethyldimethoxysilane, ethylmethoxyethoxysilane, ethyldiethoxysilane, ethylmethoxypropoxysilane, ethylmethoxypentyloxysilane, ethylethoxypropoxysilane, ethyldipropoxysilane, ethyldipentyloxysilane, ethyldiphenyloxysilane, and ethylmethoxyphenyloxysilane; propylhydrosilane compounds such as propyldimethoxysilane, propylmethoxyethoxysilane, propyldiethoxysilane, propylmethoxypropoxysilane, propylmethoxypentyloxysilane, propylethoxypropoxysilane, propyldipropoxysilane, propyldipentyloxysilane, propyldiphenyloxysilane, and propylmethoxyphenyloxysilane; butylhydrosilane compounds such as butyldimethoxysilane, butylmethoxyethoxysilane, butyldiethoxysilane, butylmethoxypropoxysilane, butylmethoxypentyloxysilane, butylethoxypropoxysilane, butyldipropoxysilane, butyldipentyloxysilane, butyldiphenyloxysilane, and butylmethoxyphenyloxysilane; phenylhydrosilane compounds such as phenyldimethoxysilane, phenylmethoxyethoxysilane, phenyldiethoxysilane, phenylmethoxypropoxysilane, phenylmethoxypentyloxysilane, phenylethoxypropoxysilane, phenyldipropoxysilane, phenyldipentyloxysilane, phenyldiphenyloxysilane, and phenylmethoxyphenyloxysilane; hydroxyphenylhydrosilane compounds such as hydroxyphenyldimethoxysilane, hydroxyphenylmethoxyethoxysilane, hydroxyphenyldiethoxysilane, hydroxyphenylmethoxypropoxysilane, hydroxyphenylmethoxypentyloxysilane, hydroxyphenylethoxypropoxysilane, hydroxyphenyldipropoxysilane, hydroxyphenyldipentyloxysilane, hydroxyphenyldiphenyloxysilane, and hydroxyphenylmethoxyphenyloxysilane; naphthylhydrosilane compounds such as naphthyldimethoxysilane, naphthylmethoxyethoxysilane, naphthyldiethoxysilane, naphthylmethoxypropoxysilane, naphthylmethoxypentyloxysilane, naphthylethoxypropoxysilane, naphthyldipropoxysilane, naphthyldipentyloxysilane, naphthyldiphenyloxysilane, naphthylmethoxyphenyloxysilane; benzylhydrosilane compounds such as benzyldimethoxysilane, benzylmethoxyethoxysilane, benzyldiethoxysilane, benzylmethoxypropoxysilane, benzylmethoxypentyloxysilane, benzylethoxypropoxysilane, benzyldipropoxysilane, benzyldipentyloxysilane, benzyldiphenyloxysilane, and benzylmethoxyphenyloxysilane; hydroxybenzylhydrosilane compounds such as hydroxybenzyldimethoxysilane, hydroxybenzylmethoxyethoxysilane, hydroxybenzyldiethoxysilane, hydroxybenzylmethoxypropoxysilane, hydroxybenzylmethoxypentyloxysilane, hydroxybenzylethoxypropoxysilane, hydroxybenzyldipropoxysilane, hydroxybenzyldipentyloxysilane, hydroxybenzyldiphenyloxysilane, and hydroxybenzylmethoxyphenyloxysilane; dimethylsilane compounds such as dimethyldimethoxysilane, dimethylmethoxyethoxysilane, dimethylmethoxypropoxysilane, dimethyldiethoxysilane, dimethyldipentyloxysilane, dimethyldiphenyloxysilane, dimethylethoxypropoxysilane, and dimethyldipropoxysilane; diethylsilane compounds such as diethyldimethoxysilane, diethylmethoxyethoxysilane, diethylmethoxypropoxysilane, diethyldiethoxysilane, diethyldipentyloxysilane, diethyldiphenyloxysilane, diethylethoxypropoxysilane, and diethyldipropoxysilane; dipropoxysilane compounds such as dipropyldimethoxysilane, dipropylmethoxyethoxysilane, dipropylmethoxypropoxysilane, dipropyldiethoxysilane, dipropyldipentyloxysilane, dipropyldiphenyloxysilane, dipropylethoxypropoxysilane, and dipropyldipropoxysilane; dibutylsilane compounds such as dibutyldimethoxysilane, dibutylmethoxyethoxysilane, dibutylmethoxypropoxysilane, dibutyldiethoxysilane, dibutyldipentyloxysilane, dibutyldiphenyloxysilane, dibutylethoxypropoxysilane, and dibutyldipropoxysilane; diphenylsilane compounds such as diphenyldimethoxysilane, diphenylmethoxyethoxysilane, diphenylmethoxypropoxysilane, diphenyldiethoxysilane, diphenyldipentyloxysilane, diphenyldiphenyloxysilane, diphenylethoxypropoxysilane, and diphenyldipropoxysilane; di(hydroxyphenyl)silane compounds such as di(hydroxyphenyl)dimethoxysilane, di(hydroxyphenyl)methoxyethoxysilane, di(hydroxyphenyl)methoxypropoxysilane, di(hydroxyphenyl)diethoxysilane, di(hydroxyphenyl)dipentyloxysilane, di(hydroxyphenyl)diphenyloxysilane, di(hydroxyphenyl)ethoxypropoxysilane, and di(hydroxyphenyl)dipropoxysilane; dinaphthylsilane compounds such as dinaphthyldimethoxysilane, dinaphthylmethoxyethoxysilane, dinaphthylmethoxypropoxysilane, dinaphthyldiethoxysilane, dinaphthyldipentyloxysilane, dinaphthyldiphenyloxysilane, dinaphthylethoxypropoxysilane, and dinaphthyldipropoxysilane; dibenzylsilane compounds such as dibenzyldimethoxysilane, dibenzylmethoxyethoxysilane, dibenzylmethoxypropoxysilane, dibenzyldiethoxysilane, dibenzyldipentyloxysilane, dibenzyldiphenyloxysilane, dibenzylethoxypropoxysilane, and dibenzyldipropoxysilane; di(hydroxybenzyl)silane compounds such as di(hydroxybenzyl)dimethoxysilane, di(hydroxybenzyl)methoxyethoxysilane, di(hydroxybenzyl)methoxypropoxysilane, di(hydroxybenzyl)diethoxysilane, di(hydroxybenzyl)dipentyloxysilane, di(hydroxybenzyl)diphenyloxysilane, di(hydroxybenzyl)ethoxypropoxysilane, and di(hydroxybenzyl)dipropoxysilane; methylethylsilane compounds such as methylethyldimethoxysilane, methylethylmethoxyethoxysilane, methylethylmethoxypropoxysilane, methylethyldiethoxysilane, methylethyldipentyloxysilane, methylethyldiphenyloxysilane, methylethylethoxypropoxysilane, and methylethyldipropoxysilane; methylpropylsilane compounds such as methylpropyldimethoxysilane, methylpropylmethoxyethoxysilane, methylpropylmethoxypropoxysilane, methylpropyldiethoxysilane, methylpropyldipentyloxysilane, methylpropyldiphenyloxysilane, methylpropylethoxypropoxysilane, and methylpropyldipropoxysilane; methylbutylsilane compounds such as methylbutyldimethoxysilane, methylbutylmethoxyethoxysilane, methylbutylmethoxypropoxysilane, methylbutyldiethoxysilane, methylbutyldipentyloxysilane, methylbutyldiphenyloxysilane, methylbutylethoxypropoxysilane, and methylbutyldipropoxysilane; methyl(phenyl)silane compounds such as methyl(phenyl)dimethoxysilane, methyl(phenyl)methoxyethoxysilane, methyl(phenyl)methoxypropoxysilane, methyl(phenyl)diethoxysilane, methyl(phenyl)dipentyloxysilane, methyl(phenyl)diphenyloxysilane, methyl(phenyl)ethoxypropoxysilane, and methyl(phenyl)dipropoxysilane; methyl(hydroxyphenyl)silane compounds such as methyl(hydroxyphenyl)dimethoxysilane, methyl(hydroxyphenyl)methoxyethoxysilane, methyl(hydroxyphenyl)methoxypropoxysilane, methyl(hydroxyphenyl)diethoxysilane, methyl(hydroxyphenyl)dipentyloxysilane, methyl(hydroxyphenyl)diphenyloxysilane, methyl(hydroxyphenyl)ethoxypropoxysilane, and methyl(hydroxyphenyl)dipropoxysilane; methyl(naphthyl)silane compounds such as methyl(naphthyl)dimethoxysilane, methyl(naphthyl)methoxyethoxysilane, methyl(naphthyl)methoxypropoxysilane, methyl(naphthyl)diethoxysilane, methyl(naphthyl)dipentyloxysilane, methyl(naphthyl)diphenyloxysilane, methyl(naphthyl)ethoxypropoxysilane, and methyl(naphthyl)dipropoxysilane; methyl(benzyl)silane compounds such as methyl(benzyl)dimethoxysilane, methyl(benzyl)methoxyethoxysilane, methyl(benzyl)methoxypropoxysilane, methyl(benzyl)diethoxysilane, methyl(benzyl)dipentyloxysilane, methyl(benzyl)diphenyloxysilane, methyl(benzyl)ethoxypropoxysilane, and methyl(benzyl)dipropoxysilane; methyl(hydroxybenzyl)silane compounds such as methyl(hydroxybenzyl)dimethoxysilane, methyl(hydroxybenzyl)methoxyethoxysilane, methyl(hydroxybenzyl)methoxypropoxysilane, methyl(hydroxybenzyl)diethoxysilane, methyl(hydroxybenzyl)dipentyloxysilane, methyl(hydroxybenzyl)diphenyloxysilane, methyl(hydroxybenzyl)ethoxypropoxysilane, and methyl(hydroxybenzyl)dipropoxysilane; ethylpropylsilane compounds such as ethylpropyldimethoxysilane, ethylpropylmethoxyethoxysilane, ethylpropylmethoxypropoxysilane, ethylpropyldiethoxysilane, ethylpropyldipentyloxysilane, ethylpropyldiphenyloxysilane, ethylpropylethoxypropoxysilane, and ethylpropyldipropoxysilane; ethylbutylsilane compounds such as ethylbutyldimethoxysilane, ethylbutylmethoxyethoxysilane, ethylbutylmethoxypropoxysilane, ethylbutyldiethoxysilane, ethylbutyldipentyloxysilane, ethylbutyldiphenyloxysilane, ethylbutylethoxypropoxysilane, and ethylbutyldipropoxysilane; ethyl(phenyl)silane compounds such as ethyl(phenyl)dimethoxysilane, ethyl(phenyl)methoxyethoxysilane, ethyl(phenyl)methoxypropoxysilane, ethyl(phenyl)diethoxysilane, ethyl(phenyl)dipentyloxysilane, ethyl(phenyl)diphenyloxysilane, ethyl(phenyl)ethoxypropoxysilane, and ethyl(phenyl)dipropoxysilane; ethyl(hydroxyphenyl)silane compounds such as ethyl(hydroxyphenyl)dimethoxysilane, ethyl(hydroxyphenyl)methoxyethoxysilane, ethyl(hydroxyphenyl)methoxypropoxysilane, ethyl(hydroxyphenyl)diethoxysilane, ethyl(hydroxyphenyl)dipentyloxysilane, ethyl(hydroxyphenyl)diphenyloxysilane, ethyl(hydroxyphenyl)ethoxypropoxysilane, and ethyl(hydroxyphenyl)dipropoxysilane; ethyl(naphthyl)silane compounds such as ethyl(naphthyl)dimethoxysilane, ethyl(naphthyl)methoxyethoxysilane, ethyl(naphthyl)methoxypropoxysilane, ethyl(naphthyl)diethoxysilane, ethyl(naphthyl)dipentyloxysilane, ethyl(naphthyl)diphenyloxysilane, ethyl(naphthyl)ethoxypropoxysilane, and ethyl(naphthyl)dipropoxysilane; ethyl(benzyl)silane compounds such as ethyl(benzyl)dimethoxysilane, ethyl(benzyl)methoxyethoxysilane, ethyl(benzyl)methoxypropoxysilane, ethyl(benzyl)diethoxysilane, ethyl(benzyl)dipentyloxysilane, ethyl(benzyl)diphenyloxysilane, ethyl(benzyl)ethoxypropoxysilane, and ethyl(benzyl)dipropoxysilane; ethyl(hydroxybenzyl)silane compounds such as ethyl(hydroxybenzyl)dimethoxysilane, ethyl(hydroxybenzyl)methoxyethoxysilane, ethyl(hydroxybenzyl)methoxypropoxysilane, ethyl(hydroxybenzyl)diethoxysilane, ethyl(hydroxybenzyl)dipentyloxysilane, ethyl(hydroxybenzyl)diphenyloxysilane, ethyl(hydroxybenzyl)ethoxypropoxysilane, and ethyl(hydroxybenzyl)dipropoxysilane; propylbutylsilane compounds such as propylbutyldimethoxysilane, propylbutylmethoxyethoxysilane, propylbutylmethoxypropoxysilane, propylbutyldiethoxysilane, propylbutyldipentyloxysilane, propylbutyldiphenyloxysilane, propylbutylethoxypropoxysilane, and propylbutyldipropoxysilane; propyl(phenyl)silane compounds such as propyl(phenyl)dimethoxysilane, propyl(phenyl)methoxyethoxysilane, propyl(phenyl)methoxypropoxysilane, propyl(phenyl)diethoxysilane, propyl(phenyl)dipentyloxysilane, propyl(phenyl)diphenyloxysilane, propyl(phenyl)ethoxypropoxysilane, and propyl(phenyl)dipropoxysilane; propyl(hydroxyphenyl)silane compounds such as propyl(hydroxyphenyl)dimethoxysilane, propyl(hydroxyphenyl)methoxyethoxysilane, propyl(hydroxyphenyl)methoxypropoxysilane, propyl(hydroxyphenyl)diethoxysilane, propyl(hydroxyphenyl)dipentyloxysilane, propyl(hydroxyphenyl)diphenyloxysilane, propyl(hydroxyphenyl)ethoxypropoxysilane, and propyl(hydroxyphenyl)dipropoxysilane; propyl(naphthyl)silane compounds such as propyl(naphthyl)dimethoxysilane, propyl(naphthyl)methoxyethoxysilane, propyl(naphthyl)methoxypropoxysilane, propyl(naphthyl)diethoxysilane, propyl(naphthyl)dipentyloxysilane, propyl(naphthyl)diphenyloxysilane, propyl(naphthyl)ethoxypropoxysilane, and propyl(naphthyl)dipropoxysilane; propyl(benzyl)silane compounds such as propyl(benzyl)dimethoxysilane, propyl(benzyl)methoxyethoxysilane, propyl(benzyl)methoxypropoxysilane, propyl(benzyl)diethoxysilane, propyl(benzyl)dipentyloxysilane, propyl(benzyl)diphenyloxysilane, propyl(benzyl)ethoxypropoxysilane, and propyl(benzyl)dipropoxysilane; and propyl(hydroxybenzyl)silane compounds such as propyl(hydroxybenzyl)dimethoxysilane, propyl(hydroxybenzyl)methoxyethoxysilane, propyl(hydroxybenzyl)methoxypropoxysilane, propyl(hydroxybenzyl)diethoxysilane, propyl(hydroxybenzyl)dipentyloxysilane, propyl(hydroxybenzyl)diphenyloxysilane, propyl(hydroxybenzyl)ethoxypropoxysilane, and propyl(hydroxybenzyl)dipropoxysilane.

The silane compound may be, for example, a silane compound represented by the following formula (c5).

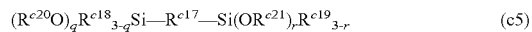

$$(R^{c20}O)_q R^{c18}_{3-q}Si-R^{c17}-Si(OR^{c21})_r R^{c19}_{3-r} \quad (c5)$$

$R^{c17}$ represents a divalent polycyclic aromatic group. $R^{c18}$ and $R^{c19}$ are divalent group bonded directly to a silicon atom, and represent a hydrogen atom, an alkyl group, an alkenyl group, or an aryl group, similar to $R^{c1}$ in the above-mentioned formula (c1), and each may be the same or different. $R^{c20}$ and $R^{c21}$ represent a hydrogen atom, a methyl group, an ethyl group, a propyl group, or a butyl group, and each may be the same or different.

q and r are each independently an integer of 1 to 3.

The polycyclic aromatic group may be either a group in which two or more rings including two or more aromatic rings are condensed, or a group in which two or more rings including two or more aromatic rings are bonded with each other through a single bond or a divalent linking group. A non-aromatic ring may also be included as a partial structure in the polycyclic aromatic group. Specific examples of the divalent linking group include an alkylene group having 1 to 6 carbon atoms, —CO—, —CS—, —O—, —S—, —NH—, —N=N—, —CO—O—, —CO—NH—, —CO—S—, —CS—O—, —CS—S—, —CO—NH—CO—, —NH—CO—NH—, —SO—, and —SO$_2$—. The polycyclic aromatic group may be a hydrocarbon group, or may include one or more heteroatoms. Examples of the heteroatom include N, S, O, and P. The number of rings included in the polycyclic aromatic group is preferably an integer of 2 to 5, and more preferably an integer of 2 to 4. The polycyclic aromatic group may also have a substituent. Examples of the substituent include a hydroxy group, an alkyl group having 1 to 6 carbon atoms, an alkoxy group having 1 to 6 carbon atoms, a halogen atom, a nitro group, an amino group, a cyano group, and an aliphatic acyl group having 2 to 6 carbon atoms. Among these substituents, preferred are alkoxy groups such as a methoxy group, an ethoxy group, a buthoxy group, and a propoxy group; and alkyl groups such as a methyl group, an ethyl group, a butyl group, and a propyl group. When the polycyclic aromatic group has a substituent, the number of substituents is not particularly limited. Typically, the number of substituents is preferably an integer of 1 to 6, and more preferably an integer of 1 to 3.

Specific examples of the divalent polycyclic aromatic group include groups in which two hydrogen atoms bonded to an aromatic ring are eliminated from a polycyclic aromatic compound selected from the group consisting of naphthalene, biphenyl, terphenyl, anthracene, phenanthrene, anthraquinone, pyrene, carbazole, N-methylcarbazole, N-ethylcarbazole, N-n-propylcarbazole, N-n-butylcarbazole, dibenzofuran, dibenzothiophene, dibenzothiophene-5,5-dioxide, fluorene, 9,9-dimethylfluorene, 9,9-diethylfluorene, 9,9-di-n-propylfluorene, 9,9-di-n-butylfluorene, and fluorenone.

Preferred specific examples of the silane compound represented by the formula (c5) are shown below.

[Chem. 30]

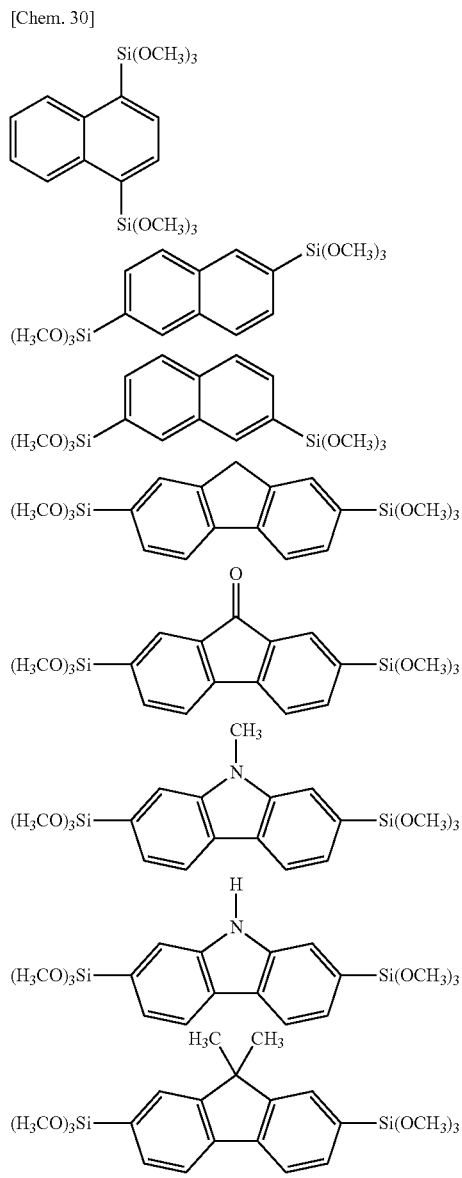

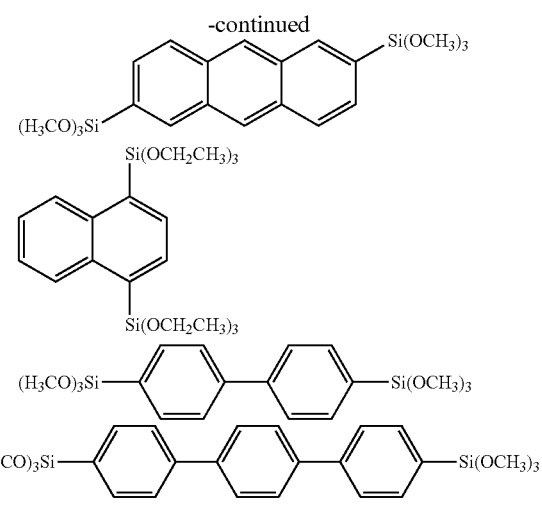

A siloxane resin is obtained by hydrolysis condensation of a silane compound in accordance with a conventional method. The mass average molecular weight of the siloxane resin is preferably 300 to 30,000, and more preferably 500 to 10,000. When mixing a siloxane resin having a mass average molecular weight in the above range in a polyimide precursor composition, film-forming properties are excellent, and peelability of a polyimide film from a substrate is improved in the peeling step, thus suppressing cloudiness. When the thus formed polyimide film is subjected to laser peeling, a polyimide film is easily peeled off with lower energy in a satisfactory manner.

Suitable examples of the siloxane resin obtained by hydrolysis condensation of the above-described silane compound include a siloxane resin including a structural unit represented by the following formula (C-1). In the siloxane resin, the number of carbon atoms is 2 or more relative to one silicon atom.

[Chem. 31]

In the formula (C-1), $R^{c22}$ is an alkyl group, an aryl group, or an aralkyl group, $R^{c23}$ is hydrogen or an alkyl group, an aryl group, or an aralkyl group, and s is 0 or 1.

The alkyl group, the aryl group, or the aralkyl group in $R^{c22}$ and $R^{c23}$ is the same as an alkyl group, an aryl group, or an aralkyl group defined in the above-mentioned formula (c1).

The alkyl group is preferably an alkyl group having 1 to 5 carbon atoms, and examples thereof include a methyl group, an ethyl group, an n-propyl group, an i-propyl group, an n-butyl group, a tert-butyl group, and the like. Examples of the aryl group and the aralkyl group include a benzyl group, a phenethyl group, a phenyl group, a naphthyl group, an anthracenyl group, a phenanthryl group, a biphenyl group, a fluorenyl group, and a pyrenyl group.

Specifically, the aryl group and the aralkyl group are preferably groups having the following structure.

[Chem. 32]

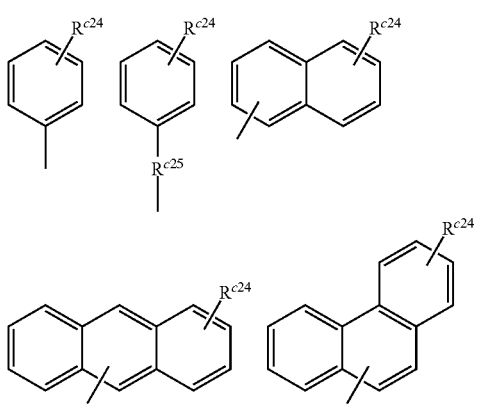

In the above formulas, $R^{c24}$ is a hydrogen atom; a hydroxyl group; an alkoxy group such as a methoxy group, an ethoxy group, a buthoxy group, or a propoxy group; or a hydrocarbon group such as a methyl group, an ethyl group, a butyl group, a propyl group, and $R^{c25}$ is an alkylene group such as a methylene group, an ethylene group, a propylene group, or a butylene group. The above aromatic hydrocarbon group may have the above $R^{c24}$ on at least one aromatic ring in the aromatic hydrocarbon group, and may also have plural ones. When having plural $R^{c24}$(s), these $R^{c24}$(s) may be the same or different.

Particularly preferred $R^{c22}$ is preferably a group having a structure represented by the following formula $(R^{c22}\text{-a})$ or $(R^{c22}\text{-b})$, and particularly preferably $(R^{22}\text{-b})$.

[Chem. 33]

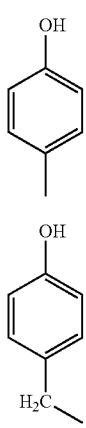

(Rc22-a)

(Rc22-b)

In the formula (C-1), s is preferably 0. In that case, a siloxane resin includes a silsesquioxane skeleton. The siloxane resin is more preferably a ladder type silsesquioxane.

In the structural unit (unit skeleton) represented by the formula (C-1), it is preferable to have the atomic number ratio of 2 or more and 15 or less carbon atoms to one silicon atom.

The siloxane resin may include two or more structural units represented by the formula (C-1). In the siloxane resin, a siloxane resin composed of different structural units represented by the formula (C-1). Specific examples of the siloxane resin including two or more structural units represented by the formula (C-1) include siloxane resins which are represented by structural units represented by the following formulas (C-1-1) to (C-1-3).

[Chem. 34]

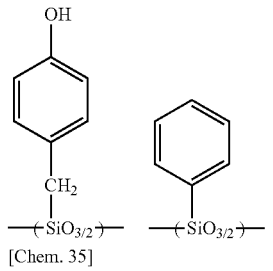

(C-1-1)

[Chem. 35]

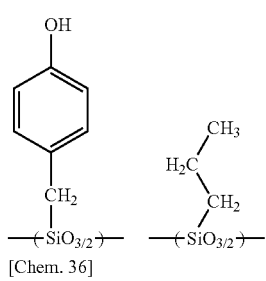

(C-1-2)

[Chem. 36]

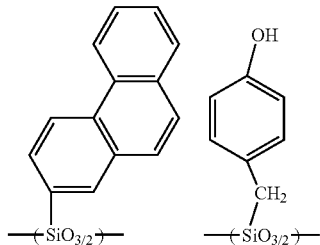

(C-1-3)

[Polysilane]

The polysilane is not particularly limited as long as it is soluble in a solvent (S), and the structure of the polysilane is not particularly limited. The polysilane may be linear, branched, network-like, or cyclic, and preferably has a linear or branched chain structure.

Suitable polysilane includes, for example, a polysilane which inevitably includes at least one of units represented by the following formulas (C-2) and (C-3), and optionally includes at least one unit selected from units represented by the following formula (C-4), (C-5), and (C-6). Such polysilane inevitably has a silanol group, or an alkyl group bonded to a silicon atom.

[Chem. 37]

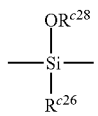

(C-2)

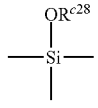

(C-3)

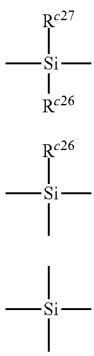

(C-4)

(C-5)

(C-6)

In the formulas (C-2), (C-4), and (C-5), $R^{c26}$ and $R^{c27}$ represent a hydrogen atom, an organic group, or a silyl group. $R^{c28}$ represents a hydrogen atom or an alkyl group. When $R^{c28}$ is an alkyl group, an alkyl group having 1 to 4 carbon atoms is preferable, and a methyl group and an ethyl group are more preferable.

As for $R^{c26}$, and $R^{c27}$, examples of the organic group include a hydrocarbon group such as an alkyl group, an alkenyl group, a cycloalkyl group, a cycloalkenyl group, an aryl group, or an aralkyl group, an alkoxy group, an alkenyloxy group, a cycloalkoxy group, a cycloalkenyloxy group, an aryloxy group, an aralkyloxy group, and the like. Among these groups, an alkyl group, an aryl group, and an aralkyl group are preferable. Suitable examples of the alkyl group, the aryl group, and the aralkyl group are the same as those defined in case where $R^{c1}$ in the above-mentioned formula (c1) is an alkyl group, an aryl group, or an aralkyl group.

When $R^{c26}$ and $R^{c27}$ are silyl groups, examples of the silyl group include a $Si_{1-10}$ silanyl group ($Si_{1-6}$ silanyl group, etc.) such as a silyl group, a disilanyl group, or a trisilanyl group.

The polysilane preferably includes the following units (C-7) to (C1-10).

[Chem. 38]

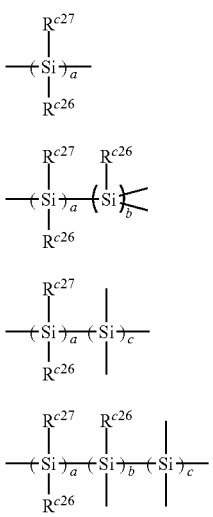

In (C-7) to (C-10), $R^{c26}$, and $R^{c27}$ are the same as $R^{c26}$ and $R^{c27}$ defined in (C-2), (C-4), and (C-5). Each of a, b, and c is an integer of 2 to 1,000. Each of a, b, and c is preferably 10 to 500, and more preferably 10 to 100. The constituent unit in each unit may be included in the unit at random, or included in a blocked state.

Among the above-descried polysilanes, preferred is a polysilane having a silanol group, an alkyl group, an aryl group, or an aralkyl group each bonded to a silicon atom in combination. More specifically, it is possible to preferably use a polysilane having a silanol group, a methyl group, or a benzyl group each bonded to a silicon atom in combination, or a polysilane having a silanol group, a methyl group, or a phenyl group each bonded to a silicon atom in combination.

The mass average molecular weight of the polysilane is preferably 0 to 100,000, more preferably 500 to 50,000, and particularly preferably 1,000 to 30,000.

[Silane Coupling Agent]

The silane coupling agent is bonded to or interacts with various components included in a polyimide precursor composition through an alkoxy group bonded to a silicon atom and/or a reactive group, or bonded to a surface of a base material such as a substrate. Therefore, the mixing of the silane coupling agent in the polyimide precursor composition leads to an improvement in adhesion of the thus formed polyimide film to a base material such as a substrate.

There is no particular limitation on the silane coupling agent. Suitable examples of the silane coupling agent include monoalkyltrialkoxysilanes such as methyltrimethoxysilane, methyltriethoxysilane, ethyltrimethoxysilane, ethyltriethoxysilane, n-propyltrimethoxysilane, n-propyltriethoxysilane, n-butyltrimethoxysilane, and n-butyltriethoxysilane; dialkyldialkoxysilanes such as dimethyldimethoxysilane and dimethyldiethoxysilane; monophenyltrialkoxysilanes such as phenyltrimethoxysilane and phenyltriethoxysilane; diphenyldialkoxysilanes such as diphenyldimethoxysilane and diphenyldiethoxysilane; monovinyltrialkoxysilanes such as vinyltrimethoxysilane and vinyltriethoxysilane; (meth)acryloxyalkylmonoalkyldialkoxysilanes such as 3-methacryloxypropyltrimethoxysilane, 3-methacryloxypropyltriethoxysilane, 3-methacryloxypropylmethyldimethoxysilane, and 3-methacryloxypropylmethyldiethoxysilane; (meth)acryloxyalkyltrialkoxysilanes such as 3-acryloxypropyltrimethoxysilane; amino group-containing tri(or di)alkoxysilanes such as 3-aminopropyltrimethoxysilane, 3-aminopropyltriethoxysilane, N-2-(aminoethyl)-3-aminopropyltrimethoxysilane, N-2-(aminoethyl)-3-aminopropyltriethoxysilane, N-2-(aminoethyl)-3-aminopropylmethyldimethoxysilane, N-2-(aminoethyl)-3-aminopropylmethyldiethoxysilane, 3-aminopropylmethyldimethoxysilane, 3-aminopropylmethyldiethoxysilane, 3-triethoxysilyl-N-(1,3-dimethylbutylidene)propylamine, N-phenyl-3-aminopropyltrimethoxysilane, N-phenyl-3-aminopropyltriethoxysilane, and N-(vinylbenzyl)-2-aminoethyl-3-aminopropyltrimethoxysilane; ketimine silanes in which an amino group thereof is protected with aldehyde; non-alicyclic epoxyfluorenylidene group-containing alkyltri(or di)alkoxysilanes such as 3-glycidoxypropyltrimethoxysilane, 3-glycidoxypropyltriethoxysilane, and 3-glycidoxypropylmethyldimethoxysilane; non-alicyclic epoxy group-containing alkylmonoalkyldialkoxysilanes such as 3-glycidoxypropylmethyldiethoxysilane; alicyclic epoxy group-containing alkyltri(or di)alkoxysilanes such as 2-(3,4-epoxycyclohexyl) ethyltrimethoxysilane, 2-(3,4-epoxycyclohexyl)ethyltriethoxysilane, 2-(3,4-epoxycyclohexyl) methyldimethoxysilane, and 2-(3,4-epoxycyclohexyl)

methyldiethoxysilane; alicyclic epoxy group-containing alkylmonoalkyldialkoxysilanes such as 2-(3,4-epoxycyclohexyl) ethylmethyldiethoxysilane; oxetanyl group-containing alkyltrialkoxysilanes such as [(3-ethyl-3-oxetanyl) methoxy]propyltrimethoxysilane and [(3-ethyl-3-oxetanyl) methoxy]propyltriethoxysilane;
mercaptoalkyltrialkoxysilanes such as 3-mercaptopropyltrimethoxysilane; mercaptoalkylmonoalkyldialkoxysilane such as 3-mercaptopropylmethyldimethoxysilane; ureidoalkyltrialkoxysilanes such as 3-ureidopropyltriethoxysilane; isocyanatealkyltrialkoxysilanes such as 3-isocyanatepropyltriethoxysilane; acid anhydride group-containing alkyltrialkoxysilanes such as 3-trimethoxysilylpropylsuccinic anhydride and trialkoxysilane having another acid anhydride group (e.g., a cyclohexanedicarboxylic anhydride group, a 4-methyl-cyclohexanedicarboxylic anhydride group, a 5-methyl-cyclohexanedicarboxylic anhydride group, a bicycloheptanedicarboxylic anhydride group, a 7-oxa-bicycloheptanedicarboxylic anhydride group, a phthalic anhydride group, etc.); carboxy group-containing alkyltrialkoxysilanes having, as a carboxy group, a succinic acid group or a half ester group thereof, a cyclohexanedicarboxylic acid group or a half ester group thereof, a 4-methyl-cyclohexanedicarboxylic acid group or a half ester group thereof, a 5-methyl-cyclohexanedicarboxylic acid group or a half ester group thereof, a bicycloheptanedicarboxylic acid group or a half ester group thereof, a 7-oxa-bicycloheptanedicarboxylic acid group or a half ester group thereof, or a phthalic acid group or a half ester group thereof; imide group-containing alkyltrialkoxysilanes such as N-tert-butyl-3-(3-trimethoxysilylpropyl)succinic acid imide; and carbamate group-containing alkyltrialkoxysilanes such as (3-trimethoxysilylpropyl)-t-butyl carbamate and (3-triethoxysilylpropyl)-tert-butyl carbamate. An amide group-containing trialkoxysilane is also suitably exemplified. The amide group-containing trialkoxysilane is obtained by a reaction of an amino group-containing trialkoxysilane with a carboxylic acid, an acid chloride, a dicarboxylic anhydride, or a tetracarboxylic anhydride, or a reaction of a carboxyl group-, acid chloride group-, or acid anhydride group-containing trialkoxysilane with an amine. Among these, preferred is an amide group-containing trialkoxysilane which is obtained by a reaction of an amino group-containing trialkoxysilane with a dicarboxylic anhydride or a tetracarboxylic anhydride, or a reaction of acid anhydride group-containing trialkoxysilane with an amine.

When an amino group-containing trialkoxysilane is reacted with an acid anhydride, examples of the amino group-containing tri(or di)alkoxysilane include a compound which is the same as the above-mentioned amino group-containing tri(or di)alkoxysilane. Examples of the dicarboxylic anhydride include polybasic anhydrides such as succinic anhydride, cyclohexanedicarboxylic anhydride, 4-methyl-cyclohexanedicarboxylic anhydride, 5-methyl-cyclohexanedicarboxylic anhydride, bicycloheptanedicarboxylic anhydride, 7-oxabicycloheptanedicarboxylic anhydride, tetrahydrophthalic anhydride, trimellitic anhydride, pyromellitic anhydride, adipic anhydride, phthalic anhydride, (3-trimethoxysilylpropyl)succinic anhydride, and (3-triethoxysilylpropyl)succinic anhydride. Examples of the tetracarboxylic anhydride include pyromellitic dianhydride, 3,3',4,4'-biphenyltetracarboxylic dianhydride, 2,3,3',4'-biphenyltetracarboxylic dianhydride, 2,2',3,3'-biphenyltetracarboxylic dianhydride, p-phenylenebis(trimellitic acid monoester acid anhydride), 1,2,5,6-naphthalenetetracarboxylic dianhydride, 2,3,6,7-naphthalenetetracarboxylic dianhydride, 3,3'-oxydiphthalic dianhydride, and 4,4'-oxydiphthalic dianhydride. These compounds can be used alone, or two or more compounds can be used in combination.

When an acid anhydride group-containing trialkoxysilane is reacted with an amine, examples of the acid anhydride group-containing trialkoxysilane include a compound which is the same as the above-mentioned acid anhydride group-containing trialkoxysilane. Examples of the amine include ammonia, methylamine, ethylamine, propylamine, isopropylamine, butylamine, tert-butylamine, pentylamine, hexylamine, 2-ethylhexylamine, heptylamine, octylamine, nonylamine, decylamine, undecylamine, dodecylamine, tetradecylamine, hexadecylamine, 1-aminooctadecane, aniline, benzylamine, cyclopropylamine, cyclobutylamine, cyclopentylamine, cyclohexylamine, cycloheptylamine, cyclooctylamine, 2-aminotoluene, 3-aminotoluene, 4-aminotoluene, 2,4-dimethylaniline, 2,3-dimethylaniline, 2,5-dimethylaniline, 2,6-dimethylaniline, 3,4-dimethylaniline, 3,5-dimethylaniline, 2,4,5-trimethylaniline, 2,4,6-trimethylaniline, 2,3,4,5-tetramethylaniline, 2,3,5,6-tetramethylaniline, 2,3,4,6-tetramethylaniline, 2-ethyl-3-hexylaniline, 2-ethyl-4-hexylaniline, 2-ethyl-5-hexylaniline, 2-ethyl-6-hexylaniline, 3-ethyl-4-hexylaniline, 3-ethyl-5-hexylaniline, 3-ethyl-2-hexylaniline, 4-ethyl-2-hexylaniline, 5-ethyl-2-hexylaniline, 6-ethyl-2-hexylaniline, 4-ethyl-3-hexylaniline, 5-ethyl-3-hexylaniline, 1,2-phenylenediamine, 1,3-phenylenediamine, 1,4-phenylenediamine, 2-aminobenzylamine, 3-aminobenzylamine, 4-aminobenzylamine, 2-(4-aminophenyl)ethylamine, 2-(3-aminophenyl)ethylamine, 2-(2-aminophenyl)ethylamine, 2,3-diaminotoluene, 2,4-diaminotoluene, 2,5-diaminotoluene, 2,6-diaminotoluene, 3,4-diaminotoluene, 2,3-dimethyl-p-phenylenediamine, 2,5-dimethyl-p-phenylenediamine, 2,6-dimethyl-p-phenylenediamine, 2,4-dimethyl-m-phenylenediamine, 2,5-dimethyl-m-phenylenediamine, 2,6-dimethyl-m-phenylenediamine, 4,5-dimethyl-m-phenylenediamine, 3,4-dimethyl-o-phenylenediamine, 3,5-dimethyl-o-phenylenediamine, 3,6-dimethyl-o-phenylenediamine, 1,3-diamino-2,4,6-trimethylbenzene, 2,3,5,6-tetramethyl-1,4-phenylenediamine, 2,4,5,6-tetramethyl-1,3-phenylenediamine, 3,4,5,6-tetramethyl-1,2-phenylenediamine, 2,4-diamino-3,5-diethyltoluene, 2,3-diamino-4,5-diethyltoluene, 2,4-diamino-4,6-diethyltoluene, 2,3-diamino-5,6-diethyltoluene, 2,4-diamino-3,6-diethyltoluene, 2,5-diamino-3,4-diethyltoluene, 2,5-diamino-3,6-diethyltoluene, 2,5-diamino-4,6-diethyltoluene, 2,3-diamino-4,5-diethyltoluene, 2,3-diamino-4,6-diethyltoluene, 2,3-diamino-4,5,6-triethyltoluene, 2,4-diamino-3,5,6-triethyltoluene, 2,5-diamino-3,4,6-triethyltoluene, 2-methoxyaniline, 3-methoxyaniline, 4-methoxyaniline, 2-methoxy-3-methylaniline, 2-methoxy-4-methylaniline, 2-methoxy-5-methylaniline, 2-methoxy-6-methylaniline, 3-methoxy-2-methylaniline, 3-methoxy-4-methylaniline, 3-methoxy-5-methylaniline, 3-methoxy-6-methylaniline, 4-methoxy-2-methylaniline, 4-methoxy-3-methylaniline, 2-ethoxyaniline, 3-ethoxyaniline, 4-ethoxyaniline, 4-methoxy-5-methylaniline, 4-methoxy-6-methylaniline, 2-methoxy-3-ethylaniline, 2-methoxy-4-ethylaniline, 2-methoxy-5-ethylaniline, 2-methoxy-6-ethylaniline, 3-methoxy-2-ethylaniline, 3-methoxy-4-ethylaniline, 3-methoxy-5-ethylaniline, 3-methoxy-6-ethylaniline, 4-methoxy-2-ethylaniline, 4-methoxy-3-ethylaniline, 2-methoxy-3,4,5-trimethylaniline, 3-methoxy-2,4,5-trimethylaniline, and 4-methoxy-2,3,5-trimethylaniline. These amines can be used alone, or two or more amines can be used in combination.

The amide group-containing trialkoxysilane may also be a compound obtained by reacting an acid dianhydride with an amino group-containing trialkoxysilane. The acid dianhydride is preferably an acid dianhydride represented by the following formula:

[Chem. 39]

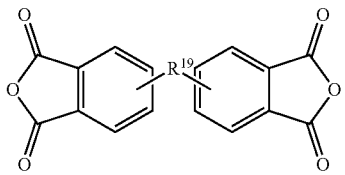

wherein $R^{19}$ represents a single bond, an oxygen atom, a sulfur atom, a carbonyl group, or an alkylene group having 1 to 5 carbon atoms.

The amino group-containing trialkoxysilane to be reacted with an acid dianhydride represented by the above formula is a compound which is the same as the amino group-containing trialkoxysilane. Preferred specific examples of the reactant are shown below.

—NHCO— or —CONH—, and $Y^{20}$ is a divalent aromatic hydrocarbon group or a divalent alicyclic hydrocarbon group], and compounds represented by the above formulas (Am-1) to (Am-3).

Among these silane coupling agents, preferred are an amino group-containing trialkoxysilane, and a ketimine silane or amide bond-containing trialkoxysilane, each having an amino group protected with aldehyde. These silane coupling agents can be used alone, or two or more silane coupling agents can be used in combination.

A compound represented by the following formula (c6) is also suitably used as a silane coupling agent:

$$R^{c29}{}_d R^{c30}{}_{(3-d)}Si—R^{c31}—NH—C(O)—Y—R^{c32}—X \quad (c6)$$

wherein, in the formula (c6), $R^{c29}$ is an alkoxy group; $R^{c30}$ is an alkyl group; d is an integer of 1 to 3; $R^{c31}$ is an alkylene group; Y is —NH—, —O—, or —S—; $R^{c32}$ is a single bond or an alkylene group; X is a nitrogen-containing heteroaryl group which may have a substituent or be monocyclic or polycyclic; a ring bonded to —Y—$R^{c32}$— in X is a nitrogen containing six-membered aromatic ring; and —Y—$R^{c32}$— is bonded to a carbon atom in the nitrogen containing six-membered aromatic ring.

[Chem. 40]

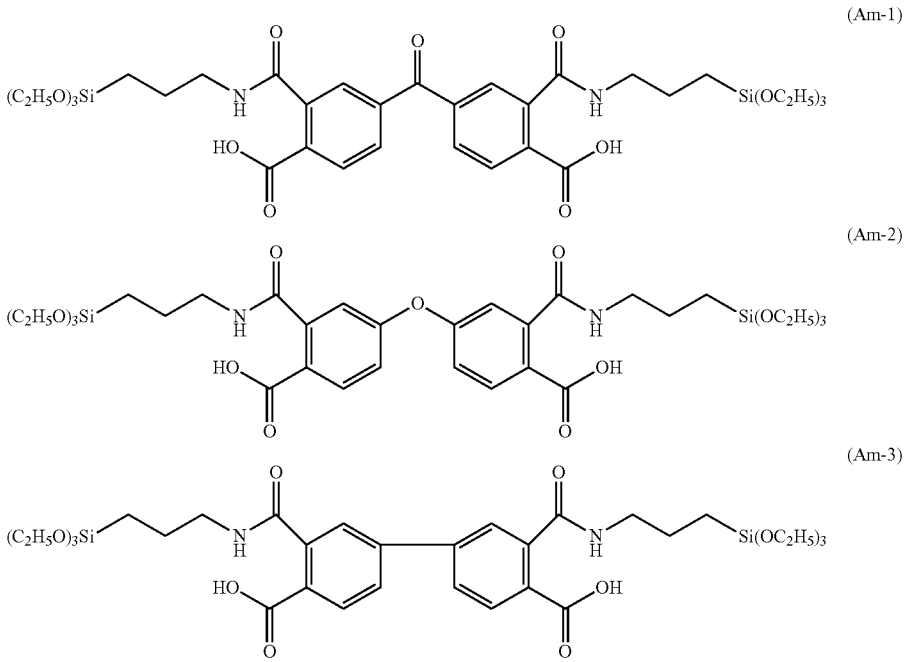

Examples of the amide group-containing trialkoxysilane are preferably 2-(3-trimethoxysilylpropyl)succinic acid monophenylamide, 3-(3-trimethoxysilylpropyl)succinic acid monophenylamide, 2-(3-triethoxysilylpropyl)succinic acid monophenylamide, 3-(3-triethoxysilylpropyl)succinic acid monophenylamide, 2-(3-methyldiethoxysilylpropyl)succinic acid monophenylamide, 3-(3-methyldiethoxysilylpropyl)succinic acid monophenylamide, amide bond-containing trialkoxysilane such as the following formula $(R^{20}O)_3Si—X^{20}—R^{21}—Y^{20}—COOH$ [provided that $R^{20}$ is an alkyl group having 1 to 12 carbon atoms, $X^{20}$ is a single bond, an alkylene group having 1 to 12 carbon atoms and optionally having an NH bond in a chain, or a fluorenylidenearyl group having 6 to 12 carbon atoms, $R^{21}$ is In the formula (c6), $R^{c29}$ is an alkoxy group. As for $R^{c29}$, the number of carbon atoms in the alkoxy group is preferably 1 to 6; more preferably 1 to 4; and particularly preferably 1 or 2 from the viewpoint of reactivity of the silane coupling agent. Preferred specific examples of $R^{c29}$ include a methoxy group, an ethoxy group, an n-propoxy group, an isopropoxy group, an n-butoxy group, an isobutoxy group, a sec-butoxy group, a tert-butoxy group, an n-pentyloxy group, and an n-hexyloxy group. Among these alkoxy groups, a methoxy group and an ethoxy group are preferable.

By reacting a silanol group formed by hydrolyzing $R^{c29}$ as an alkoxy group with a surface of a substrate, the adhesion of a substrate of a polyimide film formed by using a polyimide precursor composition on a surface of a base material such as a substrate is easily improved. Therefore, from the viewpoint of easily improving the adhesion of a polyimide film on a surface of a base material such as a substrate, m is preferably 3.

In the formula (c6), $R^{c30}$ is an alkyl group. As for $R^{c30}$, the number of carbon atoms in the alkyl group is preferably 1 to 12; more preferably 1 to 6; and particularly preferably 1 or 2 from the viewpoint of reactivity of the silane coupling agent. Preferred specific examples of $R^{c30}$ include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, an n-decyl group, an n-undecyl group, and an n-dodecyl group.

In the formula (c6), $R^{c31}$ is an alkylene group. As for $R^{c31}$, the number of carbon atoms in the alkylene group is preferably 1 to 12; more preferably 1 to 6; and particularly preferably 2 to 4. Preferred specific examples of $R^{c31}$ include a methylene group, a 1,2-ethylene group, a 1,1-ethylene group, a propan-1,3-diyl group, a propan-1,2-diyl group, a propan-1,1-diyl group, a propan-2,2-diyl group, a butan-1,4-diyl group, a butan-1,3-diyl group, a butan-1,2-diyl group, a butan-1,1-diyl group, a butan-2,2-diyl group, a butan-2,3-diyl group, a pentan-1,5-diyl group, a pentan-1,4-diyl group and a hexan-1,6-diyl group, a heptane-1,7-diyl group, an octane-1,8-diyl group, a nonane-1,9-diyl group, a decane-1,10-diyl group, an undecane-1,11-diyl group and a dodecane-1,12-diyl group. Among these alkylene groups, a 1,2-ethylene group, a propan-1,3-diyl group, and a butan-1,4-diyl group are preferable.

Y is —NH—, —O— or —S—, and preferably —NH—. Since a bond represented by —CO—NH— is more resistant to hydrolysis than a bond represented by —CO—O— or —CO—S—, when using a polyimide precursor composition containing, as a silane coupling agent, a compound in which Y is —NH—, it is possible to form a polyimide film having excellent adhesion to a base material such as a substrate.

$R^{c32}$ is a single bond or an alkylene group, and is preferably a single bond. In a case in which $R^{c32}$ is an alkylene group, preferable examples are the same as those for $R^{c31}$.

X is a nitrogen-containing heteroaryl group which can have a substituent or be monocyclic or polycyclic; a ring bonded to —Y—$R^{c32}$— in X is a nitrogen containing six-membered aromatic ring; and —Y—$R^{c32}$— is bonded to a carbon atom in the nitrogen containing six-membered aromatic ring. For an unknown reason, use of a black composition containing a compound with such X as a silane coupling agent allows formation of a polyimide film having excellent adhesion to a base material such as a substrate.

In a case in which X is a polycyclic heteroaryl group, the heteroaryl group can be either a group in which plural monocycles are condensed, or a group in which plural monocycles are bonded via a single bond. In a case in which X is a polycyclic heteroaryl group, the number of rings included in the polycyclic heteroaryl group is preferably 1 to 3. When X is a polycyclic heteroaryl group, a ring which is condensed or bonded to the nitrogen containing six-membered aromatic ring in X can be with or without a hetero atom, and can be either an aromatic ring or not.

Examples of the substituent that X, which may be possessed by a nitrogen-containing heteroaryl group, include an alkyl group having 1 to 6 carbon atoms; an alkoxy group having 1 to 6 carbon atoms; an alkenyl group having 2 to 6 carbon atoms; an alkenyloxy group having 2 to 6 carbon atoms; an aliphatic acyl group having 2 to 6 carbon atoms; a benzoyl group; a nitro group; a nitroso group; an amino group; a hydroxy group; a mercapto group; a cyano group; a sulfonic group; a carboxyl group; and a halogen atom. The number of substituents that X has is not particularly limited as long as it does not interfere with the objective of the present invention. The number of substituents that X has is preferably 5 or less, and more preferably 3 or less. In a case in which X has plural substituents, the substituents can be either identical or different.

Preferable example of X includes groups of the following formulas.

[Chem. 41]

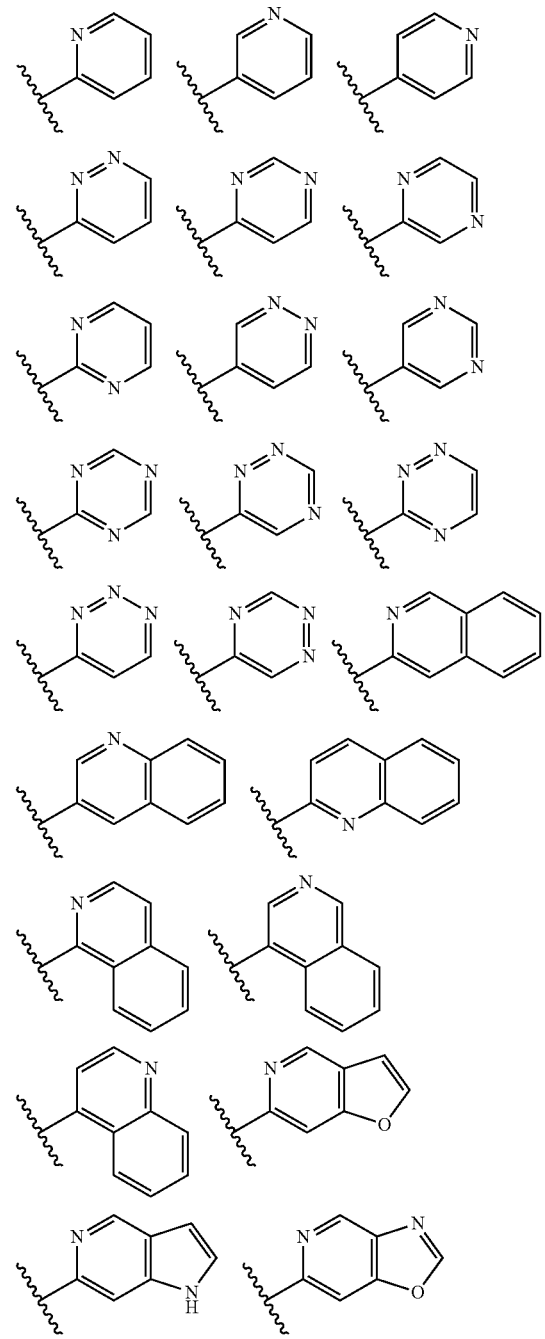

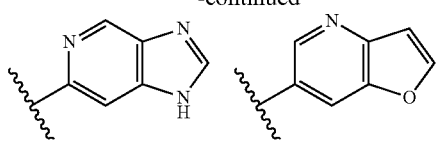
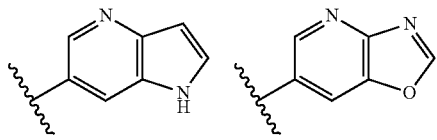
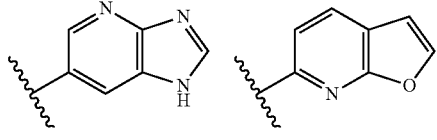
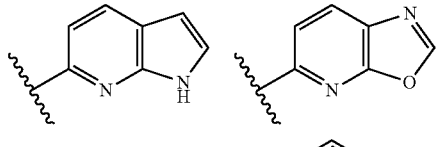
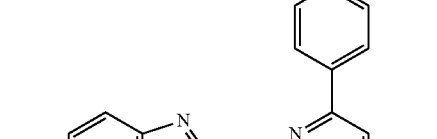
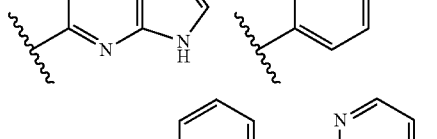
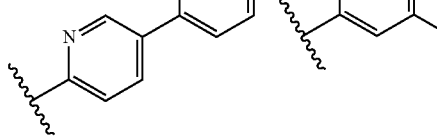
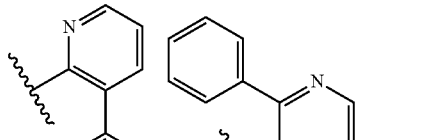
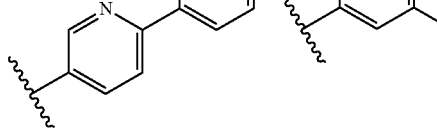
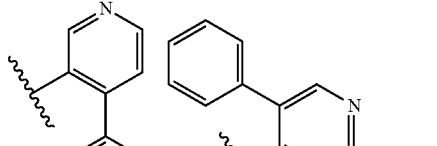
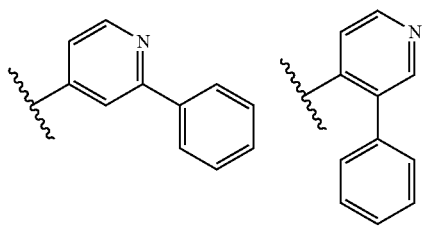
Among the above groups, the groups of the following formula are more preferable as X.
[Chem. 42]
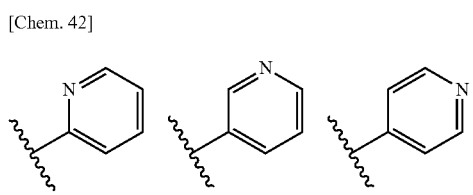
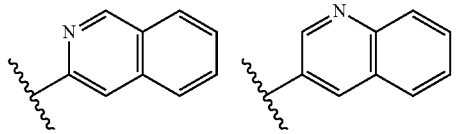
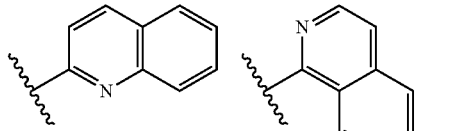
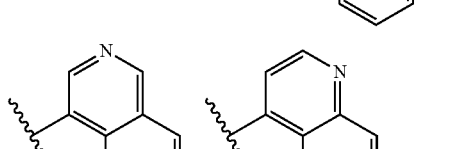
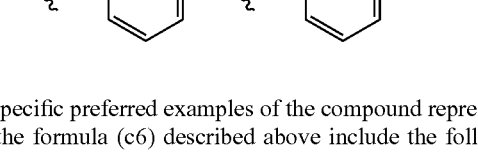
Specific preferred examples of the compound represented by the formula (c6) described above include the following compounds 1 to 8.
[Chem. 43]
Compound 1
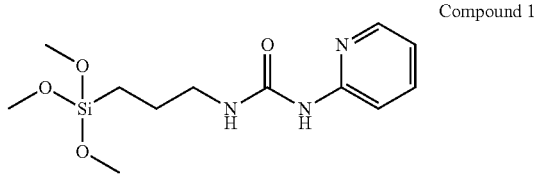
Compound 2
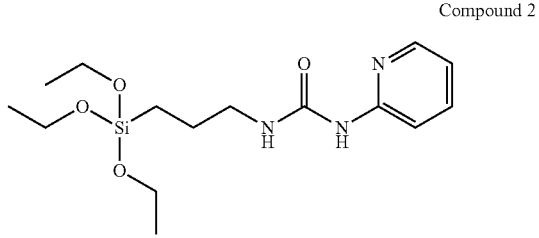

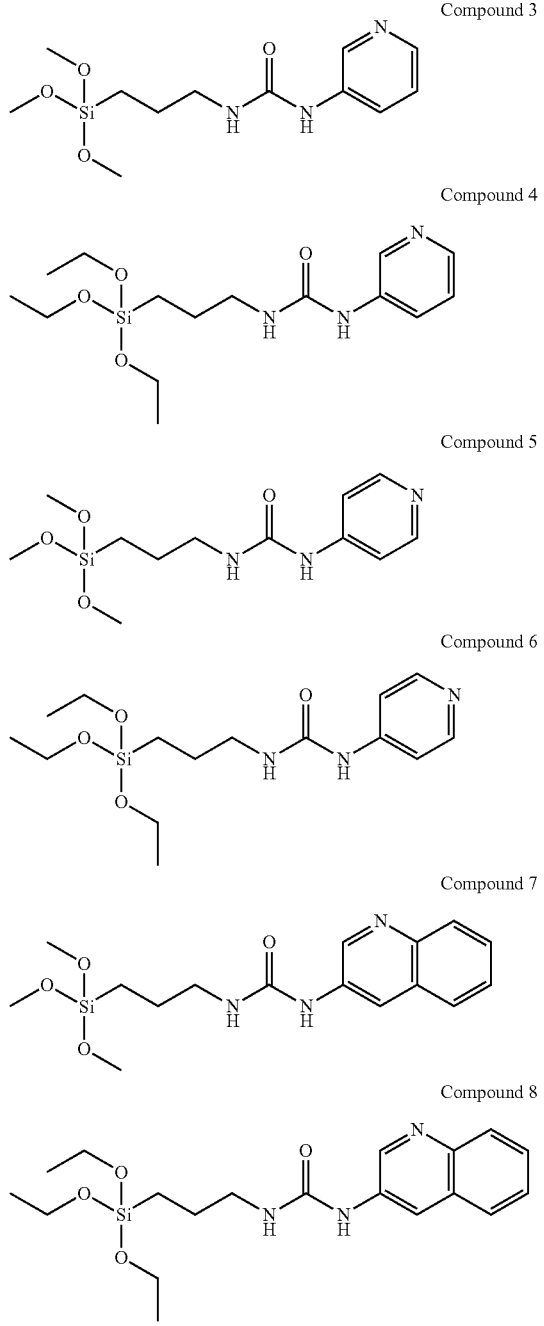

Compound 3
Compound 4
Compound 5
Compound 6
Compound 7
Compound 8

The above-described silicon-containing compounds can be used alone, or two or more silicon-containing compounds can be used in combination. The content of the above-described silicon-containing compound in the polyimide precursor composition is, for example, 0.01 to 20% by mass, preferably 0.1 to 20% by mass, more preferably 0.5 to 15% by mass, and still more preferably 1 to 10% by mass, based on the solid content of the composition. By setting the content of the silicon-containing compound in the polyimide precursor composition to be within the above range, it is easy to sufficiently exert the effect which is expected by the addition of the silicon-containing compound.

<Preparation of Polyimide Precursor Composition>

There is no particular limitation on the method for preparing a polyimide precursor composition. For example, the polyimide resin precursor composition can be prepared by mixing, as a resin precursor component (B), at least one selected from the group consisting of the above-mentioned various monomer components and a polyamic acid, a solvent (S), an imidazole compound (A) and, optionally, the above-mentioned another component.

Both the monomer components and the polyamic acid may be mixed as the resin precursor component (B). Usually, it is sufficient that only the monomer components or only the polyamic acid may be mixed. As mentioned below, in view of enabling the molecular weight to increase in the presence of an imidazole compound (A), a ring-forming polymer is preferably synthesized after mixing a monomer component as the component (B). Since the ring-closing efficiency of the ring-forming polymer can be enhanced in the presence of an imidazole compound (A), a precursor polymer is preferably mixed as the component (B).

After mixing a monomer component as the resin precursor component (B) in a solvent (S), a composition obtained by producing a polyamic acid in the presence of an imidazole compound (A) is also preferably included in the polyimide precursor composition according to the present invention.

In the preparation of the polyimide precursor composition according to the present invention, the order of mixing (adding) each component is not particularly limited. For example, an imidazole compound (A) may be mixed before or after mixing a resin precursor component (B), or mixed simultaneously.

<<Method for Producing Polyimide Film>>

The method for producing a polyimide film the present invention according to the second aspect includes a formation step of forming a coating film of the polyimide precursor composition, and a ring-closing step of heating the coating film to ring-close a polyamic acid derived from a resin precursor component (B) in the coating film. Each step will be described below.

<Formation Step>

In the formation step, the above-mentioned polyimide precursor composition is applied on a surface of the object to be coated to form a coating film of the polyimide precursor composition. Examples of the coating method include a dip coating method, a spraying method, a bar coating method, a roll coating method, a spin coating method, a curtain coating method, a die coating method, and the like. There is no particular limitation on the thickness of the coating film. Typically, the thickness of the coating film is, for example, 0.1 to 1,000 μm, preferably 2 to 100 μm, and more preferably 3 to 50 μm. The thickness of the coating film can be appropriately controlled by adjusting the coating method, and the solid component concentration and the viscosity of a polyimide precursor composition.

After formation of the coating film, before transferring to the ring-closing step, the coating film may be heated to remove a solvent (S) in the coating film. The heating temperature and the heating time are not particularly limited as long as thermal deterioration and thermal decomposition do not occur in components included in the polyimide precursor composition. When the solvent (S) in the coating film has a high boiling point, the coating film may be heated under reduced pressure.

<Ring-Closing Step>

In the ring-closing step, a polyamic acid derived from a resin precursor component (B) in the coating film is ring-closed by heating the coating film formed in the above formation step. Specifically, when a monomer component is mixed as the resin precursor component (B), formation of a polyamic acid including a repeating unit represented by the following formula (b2) as a main component and increasing the molecular weight proceeds by heating:

[Chem. 44]

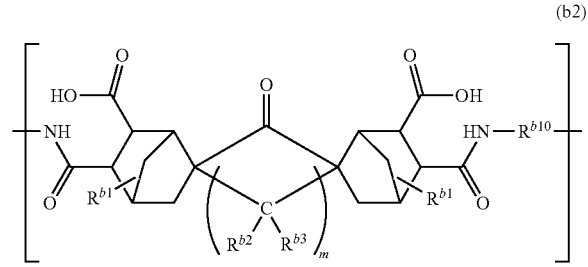

wherein, in the formula (b2), $R^{b1}$, $R^{b2}$, and $R^{b3}$ each independently represent one selected from the group consisting of a hydrogen atom, an alkyl group having 1 to 10 carbon atoms, and a fluorine atom, $R^{b10}$ represents an aryl group having 6 to 40 carbon atoms, and m represents an integer of 0 to 12.

The polyamic acid formed from such monomer component is subsequently changed into a polyimide resin by ring-closing in the ring-closing step. When the polyamic acid is mixed as the resin precursor component (B), the polymeric acid is similarly charged into a polyimide resin by ring-closing.

As mentioned above, in the ring-closing step, the polymeric acid derived from the resin precursor component (B) is changed into a polyimide resin. As a result, a film containing a polyimide resin is formed.

When the above coating film is heated, the heating temperature is set, for example, at 100 to 500° C., preferably 120 to 350° C., and more preferably 150 to 350° C. By heating the resin precursor component (B) in such a temperature range, it is possible to form a polyimide film while suppressing thermal deterioration and thermal decomposition of the resin precursor component (B) and the thus produced polyimide resin.

When the resin precursor component (B) is heated at a high temperature, high energy consumption and deterioration with time of treatment facilities at a high temperature are sometimes promoted, so that it is also preferred to heat the resin precursor component (B) at a lower temperature (sometimes referred to as "low temperature baking"). Specifically, it is possible to set the upper limit of the temperature, at which the resin precursor component (B) is heated, for example, at 220° C. or lower, preferably 200° C. or lower, more preferably 180° C. or lower, still more preferably 160° C. or lower, and yet more preferably 150° C. or lower. Even when heating at such comparatively low temperature, a polyimide resin can be sufficiently produced by heating within comparatively short time in the present invention.

Although the heating time varies depending on the composition and the thickness of the coating film, the lower limit of the heating time can be set, for example, at 0.5 hour, preferably 1 hour, and more preferably 1.5 hours, and the upper limit can be set, for example, at 4 hours, preferably 3 hours, and more preferably 2.5 hours. Such heating time can also be applied when heating, for example, at 130 to 150° C., and typically 140° C.

Low temperature baking allows the molecular weight of the polyamic acid to increase, and preferably allows the molecular weight to increase without excessively widening the molecular weight distribution. Increasing the molecular weight of the polyamic acid by low temperature baking is suitable in view of allowing the molecular weight of the thus produced polyamic acid to increase when mixing a monomer component as the resin precursor component (B). When low temperature baking is performed, an imidazole compound (A) usually remains. Therefore, the action of the imidazole compound (A) allows the molecular weight of the polyamic acid to increase, thus improving the tensile strength and elongation at break of the thus obtained polyimide film.

Heating at such comparatively low temperature also makes it possible to obtain a polyimide film having more excellent in tensile strength and elongation at break than those of a conventional polyimide film, since the polyimide precursor composition of the present invention includes the imidazole compound (A). It is considered that the imidazole compound (A) acts as a catalyst. It is considered that the thus obtained polyimide film is excellent in tensile elongation and is therefore excellent in mechanical properties.

It is also possible to perform, as the heating of the coating film, stepwise heating (sometimes referred to as "step baking") by performing low temperature baking, followed by heating at a temperature higher than the heating temperature in low temperature baking (sometimes referred to as "high temperature baking"). In high temperature baking, the upper limit of the heating temperature can be set, for example, at 500° C. or lower, preferably 450° C. or lower, more preferably 420° C. or lower, and still more preferably 400° C. or lower, and the lower limit of the heating temperature can be set, for example, at 220° C. or higher, preferably 250° C. or higher, more preferably 300° C. or higher, still more preferably 350° C. or higher, and yet more preferably 380° C. or higher. Although the heating time in high temperature baking varies depending on the composition and the thickness of the coating film, the lower limit can be set, for example, at 10 minutes or more, preferably about 20 minutes or more, and optionally 1 hour or more, and the upper limit can be set, for example, at 4 hours, preferably 3 hours, and more preferably 2.5 hours. Such heating time can also be applied when heating, for example, at 390 to 410° C., and typically 400° C.

The polyimide film is subjected to the above-mentioned low temperature baking and, when the polyimide film is formed without performing high temperature baking, the imidazole compound (A) may remain. Meanwhile, when the polyimide film is formed by performing high temperature baking, the imidazole compound (A) is sometimes decomposed and sublimated by high temperature baking, so that the imidazole compound (A) does not substantially remain. Even in the case of a polyimide film formed by performing high temperature baking, a decomposition product (e.g., the following formula (1'-2)) from the component (A) reacts with the component (B) to thereby partially bonded to a polyimide resin obtained by ring-closing a polyamic acid, whereby, the polyimide film is sometimes included in a permanent film. When the polyimide film produced by the second aspect, the permanent film of the third aspect, and the polyimide film of the fourth or fifth aspect include a component (A), there is also included the case of being partially bonded to the imide ring and/or oxazole ring-containing polymer:

[Chem. 45]

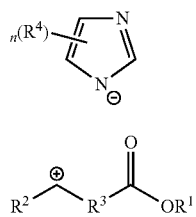

(1'-1)

(1'-2)

wherein, in the formulas (1'-1) and (1'-2), $R^1$ to $R^4$ are the same as those for the above $R^1$ to $R^4$, and n is an integer of 0 to 3.

When stepwise heating is performed, low temperature baking may be omitted. Particularly, the mixing of a monomer component as the resin precursor component (B) allows the molecular weight of a polyamic acid to increase in advance in the presence of the imidazole compound (A), so that a high molecular weight polyimide resin can be sufficiently obtained without performing low temperature baking.

Conversion into a polyimide resin can be performed to the extent enough to solve the problems of the present invention even by low temperature baking. For example, it is also possible to substantially complete a ring-closing reaction by substantially eliminating the uncyclized structure, but the uncyclized structure may partially remain after low temperature baking. A ring-closing reaction can be substantially completed by performing high temperature baking.

<Peeling Step>

When a glass substrate is used as the object to be coated or a base material during the ring-closing step, a polyimide film obtained by using the polyimide precursor composition according to the present invention may be peeled off using UV laser.

The polyimide film obtained by using the polyimide precursor composition according to the present invention is a film containing a polyimide resin, which is excellent in tensile strength and elongation at break. Therefore, such polyimide film is particularly suitable for applications that require excellent tensile strength and elongation at break. Examples of these applications include electronic circuit board members, semiconductor devices, lithium ion battery members, solar battery members, fuel battery members, gas separation membrane members, motor windings, engine peripheral members, coating materials, optical components, heat dissipating bases, and magnetic wave shielding bases, adhesives and sealants in surge components, insulating materials, substrate materials, or protective materials. It is also possible to use as a substitute of glass used in display materials, and the polyimide film is also suitable for use in flexible films for displays, and low moisture permeable films, in addition to automotive reflectors.

<<Permanent Film>>

The permanent film according to the third aspect of the present invention includes the above-mentioned imidazole compound (A), and a polyimide resin obtained by ring-closing a polyamic acid including a repeating unit represented by the above-mentioned formula (b2) as a main component. The permanent film is a film formed on components constituting the product, or between components, and is a general term of a film remaining after completion of the product. The permanent film can be suitably obtained by the above-mentioned method for producing a polyimide film according to the second aspect of the present invention.

The permanent film of the present invention includes an imidazole compound (A) and has more excellent tensile strength and elongation at break than those of a conventional polyimide film even if it is a film formed at comparatively low temperature.

Therefore, the permanent film of the present invention can be used, for example, as a permanent film for a liquid crystal element or organic EL element, and is suitable as a permanent film for an organic EL element. An insulating film or a flattened film is suitable as the permanent film.

<<Polyimide Film>>

A fourth aspect of the present invention is directed to a polyimide film obtained by using the polyimide precursor composition according to the first aspect. The polyimide film of the fourth aspect is not limited to a film used as a permanent film. The method for producing a polyimide film according to the fourth aspect is not particularly limited as long as it is a method using the polyimide precursor composition according to the first aspect. The polyimide film according to the fourth aspect is preferably produced by the method for producing a polyimide film according to the second aspect.

A fifth aspect of the present invention is directed to a polyimide film includes the above-mentioned imidazole compound (A), and a polyimide resin in which a polyamic acid composed of a repeating unit represented by the above-mentioned formula (b2) is ring-closed. The polyimide film according to the fifth aspect is not limited to a film used as a permanent film. The method for producing a polyimide film according to the fifth aspect is not particularly limited as long as a polyimide film includes a predetermined component. The polyimide film according to the fifth aspect is typically produced by the method for producing a polyimide film according to the second aspect using the polyimide precursor composition including a polyamic acid composed of a repeating unit represented by the above-mentioned formula (b2) or a resin precursor component (B) selected so as to produce the polyamic acid according the first aspect.

EXAMPLES

The present invention will be specifically described below by way of Examples, but the scope of the present invention is not limited to these Examples.

Synthesis Example 1

In Synthesis Example 1, an imidazole compound (A1) having the following structure was synthesized.

[Chem. 46]

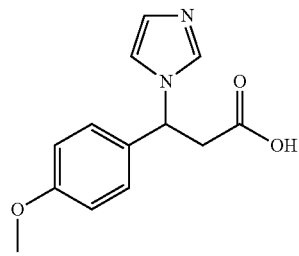

First, 30 g of a cinnamic acid derivative having the following structure was dissolved in 200 g of methanol, and 7 g of potassium hydroxide was added in methanol. Then, the methanol solution was stirred at 40° C. After distilling off methanol, the residue was suspended in 200 g of water. The suspension thus obtained was mixed with 200 g of tetrahydrofuran, followed by stirring and further separation of an aqueous phase. Under ice cooling, 4 g of hydrochloric acid was added. After stirring, 100 g of ethyl acetate was mixed, followed by stirring. After the mixed solution was left to stand, an oil phase was separated. The objective product was crystallized from the oil phase, and the precipitate was recovered to obtain an imidazole compound (A1) having the above structure.

[Chem. 47]

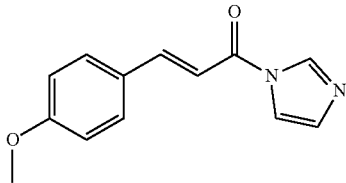

The measurement results of $^1$H-NMR of the imidazole compound (A1) having the above structure are as mentioned below.

$^1$H-NMR (DMSO): 11.724 (s, 1H), 7.838 (s, 1H), 7.340 (d, 2H, J=4.3 Hz), 7.321 (d, 1H, J=7.2 Hz), 6.893 (d, 2H, J=4.3 Hz), 6.876 (d, 1H, J=6.1 Hz), 5.695 (dd, 1H, J=4.3 Hz, 3.2 Hz), 3.720 (s, 3H), 3.250 (m, 2H)

Example 1

<Preparation of Tetracarboxylic Dianhydride>

In accordance with the methods mentioned in Synthesis Example 1, Example 1 and Example 2 of WO 2011/099518 A, a tetracarboxylic dianhydride (norbornane-2-spiro-α-cyclopentanone-α'-spiro-2"-norbornane-5,5",6,6"-tetracarboxylic dianhydride) represented by the following formula was prepared.

[Chem. 48]

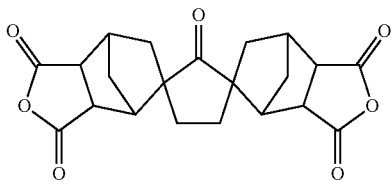

<Preparation of Polyamic Acid>

First, a 30 ml three-necked flask was sufficiently dried by heating using a heat gun. Then, the three-necked flask was purged with nitrogen to replace an atmospheric gas in the three-necked flask with a nitrogen atmosphere. In the three-necked flask, 0.2045 g of 4,4'-diaminobenzanilide (0.90 mmol, DABAN manufactured by Nipponjunryo Chemicals Co., Ltd.) was added and 3.12 g of N,N,N',N'-tetramethylurea (TMU) was added. Contents in the three-necked flask were stirred to obtain a slurry solution in which an aromatic diamine (DABAN) is dispersed in TMU. After adding 0.3459 g (0.90 mmol) of tetracarboxylic dianhydride of the above formula in the three-necked flask, contents in the flask were stirred under a nitrogen atmosphere at room temperature (25° C.) for 12 hours to obtain a reaction solution. The reaction solution thus obtained contains 15% by mass (TMU solvent: 85 parts by mass) of a polyamic acid.

<Addition Step of Imidazole Compound (A)>

To the thus obtained reaction solution, the imidazole compound A1 (0.206 g, 5.6 parts by mass based on 100 parts by mass of the reaction solution) obtained in Synthesis Example 1 was added under a nitrogen atmosphere. Then, the reaction solution was stirred at 25° C. for 12 hours to obtain a liquid polyimide precursor composition including an imidazole compound (A) and a polyamic acid.

<Preparation of Polyimide Film>

On a glass substrate (large-sized slide glass, manufactured by Matsunami Glass Ind., Ltd. under the trade name of "S9213", having a size of 76 mm in length, 52 mm in width, and 1.3 mm in thickness), the thus obtained polyimide precursor composition was spin-coated so that the thickness of a coating film after curing under heat became 13 μm to form a coating film. Then, the glass substrate having the coating film formed thereon was placed on a hot plate at 60° C. and left to stand for 2 hours, whereby, the solvent was removed by vaporization from the coating film. After removal of the solvent, the glass substrate having the coating film formed thereon was placed in an inert oven in which nitrogen flows at a flow rate of 3 L/minute. In the inert oven, the coated glass substrate was left to stand under a nitrogen atmosphere at a temperature of 25° C. for 0.5 hour, followed by heating at a temperature of 135° C. for 0.5 hour and further heating at a temperature of 300° C. (final heating temperature) for 1 hour to thereby cure the coating film, thus obtaining a polyimide coated glass in which a thin film of a polyimide (polyimide film) is coated on the glass substrate.

The polyimide coated glass thus obtained was immersed in hot water at 90° C. to thereby peel off a polyimide film from the glass substrate to obtain a polyimide film (film having a size of 76 mm in length, 52 mm in width, and 13 μm in thickness).

To identify a molecular structure of a resin which is the material of the thus obtained polyimide film, IR spectrum of a sample of the polyimide film was measured by using an IR spectrometer (manufactured by JASCO Corporation under the trade name of FT/IR-4100). The measurement results revealed that C=O stretching vibration of imidocarbonyl is observed at 1696.2 cm$^{-1}$ in IR spectrum of the resin which is the material of the polyimide film. The molecular structure identified based on these results revealed that the thus obtained polyimide film is surely formed of a polyimide resin.

With respect to the thus obtained polyimide film, in accordance with the following method, measurements were made of the coefficient of thermal expansion (CTE), the tensile strength and elongation at break, the glass transition temperature of a polyimide resin, the total light transmittance, the Haze (turbidity), and the yellowness index (YI). These evaluation results are shown in Table 1.

<Measurement of Coefficient of Thermal Expansion>

The coefficient of thermal expansion of the polyimide film is desirably 20 ppm/K or less. If such coefficient of thermal expansion exceeds the upper limit, peeling easily occurs due to thermal history when a composite material is fabricated by using metal having a coefficient of thermal expansion in a range of 5 to 20 ppm/K in combination of an inorganic substance. From the viewpoint of sufficiently suppressing peeling from occurring due to thermal history and of being capable of more improving the dimensional stability, the coefficient of thermal expansion of such polyimide film is more preferably −20 to 20 ppm/K, and still more preferably 0 to 15 ppm/K. When such coefficient of thermal expansion is less than the lower limit, peeling and curling may easily occur. The following value is employed as the value of the coefficient of thermal expansion of such polyimide film. First, with respect to the polyimide film as the measuring object, a film having a size of 76 mm in length, 52 mm in width, and 13 μm in thickness, formed of the material, which is the same as the material forming a polyimide film thereof (polyimide), is formed. Then, the film is vacuum-dried (at 120° C. for 1 hour) and subjected to a heat treatment under a nitrogen atmosphere at 200° C. for 1 hour to obtain a dry film. Using the thus obtained dry film as a sample and employing a thermomechanical analyzer (manufactured by Rigaku Corporation under the trade name of "TMA8310") as a measuring device, change of length in the longitudinal direction 50° C. to 200° C. of the sample is measured under a nitrogen atmosphere under the conditions of a tensile mode (49 mN) and a temperature rise rate of 5° C./minute to determine an average of change of length per 1° C. (1K) in a temperature range of 50° C. to 200° C. Then, the average thus determined is employed as the value of the coefficient of thermal expansion of the polyimide film of the present invention (the value of the coefficient of thermal expansion of the polyimide film having a thickness of 13 μm is employed as the value of the coefficient of thermal expansion of the polyimide film of the present invention).

<Measurement of Tensile Strength and Elongation at Break>

The tensile strength (unit: MPa) and the elongation at break (unit: %) of the polyimide film (thickness of 13 μm) were measured in accordance with the following methods. First, "Super Dumbbell Cutter (trade name) (Model: SDMK-1000-D, in accordance with A22 standard of JIS K7139 (issued in 2009))" manufactured by DUMBBELL CO., LTD. was attached to an SD type lever-controlled sample cutter (cutter (Model: SDL-200), manufactured by DUMBBELL CO., LTD.), and then a polyimide film was cut so as to have a size of 75 mm in total length, 57 mm in distance between the tab portions, 30 mm in length of the parallel portion, 30 mm in radius of the shoulder portion, 10 mm in width of the end portion, 5 mm in width of the central parallel portion, and 13 μm in thickness to fabricate a Dumbbell-shaped specimen (specimen fabricated in accordance with the standard of JIS K7139 type A22 (scale specimen), except that the thickness was set at 13 μm) as a measurement sample. After disposing the measurement sample so as to set a width between holding tools at 57 mm and a width of the holding portion at 10 mm (total width of the end portion), a tensile test of pulling a measurement sample under the conditions of a full-scale load of 0.05 kN and a test speed of 1 to 300 mm/minute was performed using a Tensilon universal-testing machine (manufactured by A&D Company, Limited, Model "UCT-10T") to determine the tensile strength and the elongation at break. The above test is a test in accordance with JIS K7162 (issued in 1994). The value of the elongation at break (%) was determined by calculation of the following equation:

[Elongation at break (%)]={$(L-L_0)/L_0$}×100 where $L_0$ is a length of the parallel portion of the specimen (=length of the parallel portion: 30 mm) and L is a length of the parallel portion of the specimen until it breaks (length of the parallel portion of the specimen when it breaks: 30 mm+α).

<Measurement of Glass Transition Temperature (Tg)>

Using a thermomechanical analyzer (manufactured by Rigaku Corporation under the trade name of "TMA8311"), the value (unit: ° C.) of a glass transition temperature (Tg) of a polyimide resin, which is the material of a polyimide film, was measured by penetrating a pin made of transparent quartz (tip diameter of 0.5 mm) under pressure of 500 mN into the film under a nitrogen atmosphere at a temperature rise rate 5° C./minute in a temperature range of 30° C. to 550° C. (scanning temperature) (measurement by a so-called penetration method). With respect to the material of films formed by using polyimide precursor compositions of all Examples and Comparative Examples, no glass transition temperature could be confirmed.

<Measurement of Total Light Transmittance, Haze (Turbidity), and Yellowness Index (YI)>

Using "Haze Meter NDH-5000" (trade name, manufactured by Nippon Denshoku Industries Co., Ltd.) as a measuring device, the value of total light transmittance (unit: %), Haze (turbidity), and yellowness index (YI) were determined by measuring in accordance with JIS K7361-1 (issued in 1997).

Examples 2 to 8, Comparative Example 1 and Comparative Example 2

In the same manner as in Example 1, except that the amount of the imidazole compound A1 as the component (A) is changed to the amount shown in Table 1 and the solvent shown in Table 1 is used as the solvent (S), polyimide precursor compositions were obtained. Namely, the imidazole compound A1 was added in the amount (parts by mass) shown in Table 1 based on 100 parts by mass of the total of the polyamic acid obtained by preparation of the polyamic acid and the solution of the solvent shown in Table 1. In Example 7, the imidazole compound A1 was added to the reaction solution during preparation of the polyamic acid. Namely, 4.5 parts by mass of the imidazole compound A1 was added to 100 parts by mass of a mixed solution of polyamic acid (molecular weight of about 8,000), 4,4'-diaminobenzanilide, norbornane-2-spiro-α-cyclopentanone-α'-spiro-2"-norbornane-5,5",6,6"-tetracarboxylic dianhydride, and the solvent shown in Table 1.

Using the polyimide precursor compositions of the respective Examples and Comparative Examples, a polyimide film was formed in the same manner as in Example 1. In Example 8, curing conditions of the coating film are as follows: 80° C.×30 minutes, 300° C.×30 minutes, and 380° C.×30 minutes. With respect to the thus obtained polyimide film, in the same manner as in Example 1, measurements were made of the coefficient of thermal expansion, the tensile strength and elongation at break, the glass transition temperature of a polyimide resin, the total light transmittance, the Haze (turbidity), and the yellowness index (YI). These evaluation results are shown in Table 1.

TABLE 1

| | (A) Component | | Solvent (S) | | Tg (° C.) | CTE (ppm/K) | Yellowness index | Total light transmittance (%) | Haze (%) | Tensile strength (MPa) | Elongation at break (%) |
|---|---|---|---|---|---|---|---|---|---|---|---|
| | Parts by mass | | Type | Parts by mass | | | | | | | |
| Example 1 | 5.6 | | TMU | 85 | N.D. | 11.0 | 3.5 | 88.1 | 0.5 | 177 | 14.9 |
| Example 2 | 4.5 | | TMU | 85 | N.D. | 12.7 | 2.8 | 88.0 | 0.6 | 142 | 9.1 |
| Example 3 | 3.4 | | TMU | 85 | N.D. | 10.8 | 2.6 | 88.1 | 0.4 | 121 | 5.7 |
| Example 4 | 2.3 | | TMU | 85 | N.D. | 11.5 | 2.7 | 88.1 | 0.3 | 109 | 4.3 |
| Example 5 | 1.1 | | TMU | 85 | N.D. | 10.6 | 2.8 | 88.1 | 0.5 | 75 | 3.1 |
| Example 6 | 4.5 | | DMAc | 85 | N.D. | 12.4 | 3.3 | 88.0 | 0.2 | 157 | 9.0 |
| Example 7 | 4.5 | | TMU | 85 | N.D. | 10.5 | 2.2 | 88.2 | 0.5 | 127 | 9.0 |
| Example 8 | 4.5 | | TMU | 85 | N.D. | 12.1 | 3.7 | 88.8 | 0.3 | 224 | 37.9 |
| Comparative Example 1 | None | | TMU | 85 | N.D. | 10.8 | 3.2 | 87.4 | 0.7 | 53 | 1.9 |
| Comparative Example 2 | None | | DMAc | 85 | N.D. | 11.0 | 3.2 | 87.6 | 0.6 | 42 | 2.0 |

As is apparent from Table 1, use of the polyimide precursor compositions of Examples, which includes an imidazole compound having a predetermined structure represented by the formula (1) as the component (A), enables formation of a polyimide film which has high heat resistance, and having satisfactory tensile strength and elongation at break, high total light transmittance, and low yellowness index and Haze. Meanwhile, as is apparent from Comparative Examples, when the polyimide precursor composition does not include an imidazole compound having a predetermined structure represented by the formula (1) as the component (A), it is possible to form only a polyimide film having low tensile strength and elongation at break.

Example 9 to Example 13

In Example 9, the polyimide precursor composition obtained in Example 1 was used. In Examples 10 to 13, a composition, prepared by adding the following silicon-containing compounds D1 to D4, as an additive, in the amount shown in Table 2 based on 100 parts by mass of the solid content in the polyimide precursor composition in Example 1, was used. In the same manner as in <Preparation of Polyimide Film> of Example 1, except that using the thus obtained respective polyimide precursor compositions, laser peeling (excimer laser peeling with 308 nm line beam, overlap of line beam: 50%) was performed in the energy amount shown in Table 2, a polyimide film was obtained. Evaluation was made on adhesion of a polyimide film to glass as a substrate, cloudiness when laser peeling is performed, and peelability. The results are also shown in Table 2.

TABLE 2

| | Additive [Parts by mass] | Adhesion | Exposure dose | | | | | |
|---|---|---|---|---|---|---|---|---|
| | | | 100 mJ/cm$^2$ | | 90 mJ/cm$^2$ | | 85 mJ/cm$^2$ | |
| | | | Cloudiness | Peelability | Cloudiness | Peelability | Cloudiness | Peelability |
| Example 9 | None | Weak (0) | Slight B | Ordinary B | Slight B | Ordinary B | None A | Ordinary B |
| Example 10 | D-1 [1.5] | Medium (2) | Slight B | Satisfactory A | None A | Ordinary B | None A | Ordinary B |
| Example 11 | D-2 [1.5] | Strong (3) | Slight B | Satisfactory A | Slight B | Satisfactory A | None A | Satisfactory A |
| Example 12 | D-3 [1.5] | Little (1) | Slight B | Satisfactory A | Slight B | Ordinary B | None A | Ordinary B |
| Example 13 | D-4 [1.5] | Strong (3) | Slight B | Satisfactory A | Slight B | Satisfactory A | None A | Satisfactory A |

Additives D-1 to D-4 shown in Table 2 are as follows.
D-1: Silane coupling agent of the following formula

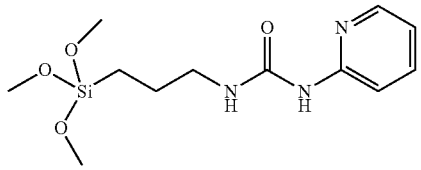

D-2: Silane coupling agent of the following formula

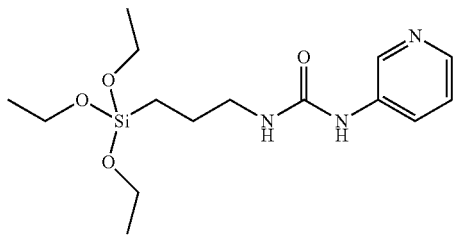

D-3: Chain polysilane having a silanol group bonded to a silicon atom, a phenyl group, and a methyl group (mass average molecular weight of 1,500)
D-4: 3-Aminopropyltriethoxysilane
[Evaluation] In accordance with the following criteria, valuation was made on adhesion of polyimide films obtained in Example 9 to Example 13 to a glass substrate, cloudiness when laser peeling is performed, and peelability. Newton's rings in peelability evaluation mean a phenomenon confirmed when a gap occurs between glass and film during laser peeling, leading to interference of light.
(Adhesion)
0: A polyimide film is easily peelable from a glass substrate with a very weak force without feeling peeling resistance.
1: Although feeling weak peeling resistance, a polyimide film is peelable from a glass substrate with a weak force.
2: Although feeling strong peeling resistance, a polyimide film is peelable from a glass substrate with a strong force.
3: A polyimide film is not peelable from a glass substrate even with a very strong force, or breakage of the polyimide film occurs when peeling the polyimide film from the glass substrate, thus remaining the polyimide film on the glass substrate.
(Cloudiness)
A: Not visually confirmed
B: Visually confirmed slightly
C: Visually confirmed
(Peelability)
A: Newton's rings are confirmed
B: Newton's rings are slightly confirmed
C: Newton's rings are not confirmed As is apparent from Table 2, when the silicon-containing compound is added to the polyimide precursor composition (Examples 10 to 13), adhesion of the thus formed polyimide film to the glass substrate could be improved as compared to the case where no silicon-containing compound is added (Example 9). It has been confirmed that it is possible to suppress cloudiness due to UV laser peeling to be equal to or greater than the case of adding no silicon-containing compound even in a state of high substrate adhesion. In Example 10 and Example 13, satisfactory peelability was exhibited even in an exposure dose with low energy. In Example 10 and Example 13, strongest adhesion was achieved. Because of satisfactory peelability, additives (D-2, D-4) used can be said to be additives which are excellent in glass adhesion while sufficiently maintaining the strength of the polyimide film, and are particularly effective as additives for laser abrasion (which are free from cloudiness and are laser peelable).
(Total Light Transmittance and Haze (Turbidity))

In the same manner as in Example 1, except that the diamine component was changed from only DABAN to a mixed component (molar ratio (DABAN:X-22-9409=98:2)) of DABAN and a both-end amino-modified methyl phenyl silicone ("X-22-9409", manufactured by Shin-Etsu Chemical Co., Ltd.), a polyimide film was formed. The results revealed that a polyimide film having a total light transmittance of 89.9% and Haze of 0.3 is obtained.

The invention claimed is:
1. A polyimide precursor composition comprising an imidazole compound (A), a resin precursor component (B), and a solvent (S), wherein
the imidazole compound (A) is a compound represented by the following formula (1):

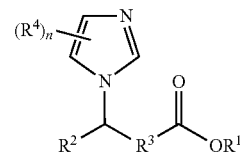

wherein, in the formula (1), $R^1$ is a hydrogen atom or an alkyl group, $R^2$ is an optionally substituted aromatic group, $R^3$ is an optionally substituted alkylene group, $R^4$ each independently represent a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group, n is an integer of 0 to 3; and
the resin precursor component (B) is at least one selected from the group consisting of (a) and (b):
wherein (a) is a monomer component containing a diamine compound represented by the following formula (2):

$$H_2N—R^{b10}—NH_2 \qquad (2)$$

wherein, in the formula (2), $R^{b10}$ is an aryl group having 6 to 40 carbon atoms, and
norbornane-2-spiro-α-cycloalkanone-α'-spiro-2"-norbornane-5,5",6,6"-tetracarboxylic dianhydrides represented by the following formula (b1):

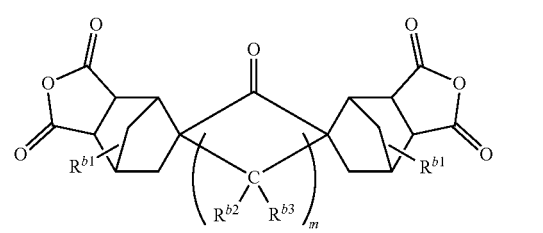

wherein, in the formula (b1), $R^{b1}$, $R^{b2}$, and $R^{b3}$ each independently represent one selected from the group consisting of a hydrogen atom, an alkyl group having 1 to 10 carbon atoms, and a fluorine atom, and m represents an integer of 0 to 12, and wherein (b) is a polyamic acid including a repeating unit represented by the following formula (b2):

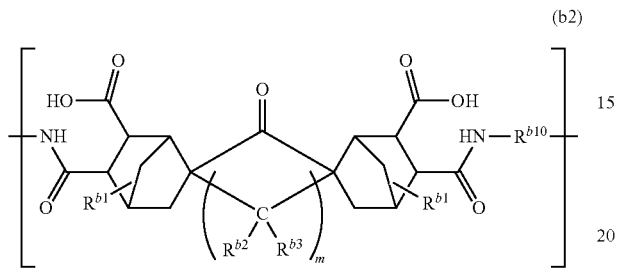

(b2)

wherein, in the formula (b2), $R^{b1}$, $R^{b2}$, and $R^{b3}$ each independently represent one selected from the group consisting of a hydrogen atom, an alkyl group having 1 to 10 carbon atoms, and a fluorine atom, $R^{b10}$ represents an aryl group having 6 to 40 carbon atoms, and m represents an integer of 0 to 12.

2. The polyimide precursor composition according to claim 1, further comprising one or more silicon-containing compounds selected from the group consisting of a silicon-containing resin, a silicon-containing resin precursor, and a silane coupling agent.

3. A method for producing a polyimide film, comprising:
forming a coating film of the polyimide precursor composition according to claim 1; and
heating the coating film to ring-close a polyamic acid derived from a resin precursor component (B) in the coating film.

4. A polyimide film comprising an imidazole compound (A) and a polyimide resin, wherein the imidazole compound (A) is a compound represented by the following formula (1):

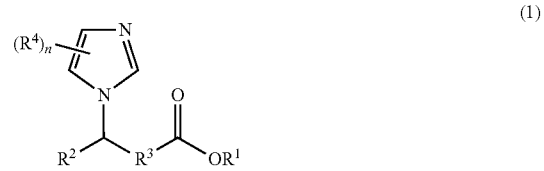

(1)

wherein, in the formula (1), $R^1$ is a hydrogen atom or an alkyl group, $R^2$ is an optionally substituted aromatic group, $R^3$ is an optionally substituted alkylene group, $R^4$ each independently represent a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group, and n is an integer of 0 to 3; and the polyimide resin is a resin in which polyamic acid composed of a repeating unit represented by the following formula (b2):

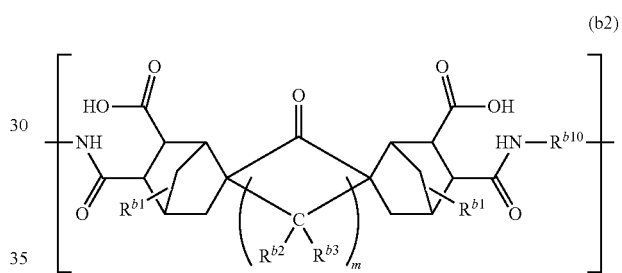

(b2)

wherein, in the formula (b2), $R^{b1}$, $R^{b2}$, and $R^{b3}$ each independently represent one selected from the group consisting of a hydrogen atom, an alkyl group having 1 to 10 carbon atoms, and a fluorine atom, $R^{b10}$ represents an aryl group having 6 to 40 carbon atoms, and m represents an integer of 0 to 12 is ring-closed.

* * * * *